United States Patent
Won et al.

(10) Patent No.: US 11,906,757 B2
(45) Date of Patent: Feb. 20, 2024

(54) BEAM DEFLECTOR, 3-DIMENSIONAL DISPLAY DEVICE INCLUDING THE SAME, AND METHOD OF DEFLECTING BEAM

(71) Applicant: SAMSUNG ELECTRONICS CO., LTD., Suwon-si (KR)

(72) Inventors: Kanghee Won, Seoul (KR); Young Kim, Yongin-si (KR); Jungkwuen An, Suwon-si (KR); Hongseok Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 552 days.

(21) Appl. No.: 17/060,419

(22) Filed: Oct. 1, 2020

(65) Prior Publication Data

US 2021/0294115 A1    Sep. 23, 2021

(30) Foreign Application Priority Data

Mar. 18, 2020   (KR) .................. 10-2020-0033418

(51) Int. Cl.
*G02F 1/29*    (2006.01)
*G02B 30/25*   (2020.01)

(52) U.S. Cl.
CPC ............ *G02B 30/25* (2020.01); *G02F 1/292* (2013.01)

(58) Field of Classification Search
None
See application file for complete search history.

(56) References Cited

U.S. PATENT DOCUMENTS

| | | |
|---|---|---|
| 6,364,488 B1 | 4/2002 | Lin |
| 9,052,565 B2 | 6/2015 | Shikii et al. |
| 10,490,140 B2 | 11/2019 | Kim et al. |
| 10,788,727 B2 | 9/2020 | Kim et al. |
| 2018/0129105 A1 | 5/2018 | Kim et al. |
| 2019/0113802 A1 | 4/2019 | Won et al. |
| 2019/0258069 A1 | 8/2019 | Song et al. |
| 2020/0285110 A1 | 9/2020 | Won et al. |

FOREIGN PATENT DOCUMENTS

| | | |
|---|---|---|
| EP | 3 474 069 A1 | 4/2019 |
| EP | 3 528 041 A1 | 8/2019 |
| KR | 10-2017-0084951 A | 7/2017 |
| KR | 10-2018-0052356 A | 5/2018 |
| KR | 10-2019-0043438 A | 4/2019 |
| KR | 10-2019-0099724 A | 8/2019 |

OTHER PUBLICATIONS

Communication dated Jul. 23, 2021, from the European Patent Office in European Application No. 21161281.7.

*Primary Examiner* — Thanh Nhan P Nguyen
(74) *Attorney, Agent, or Firm* — Sughrue Mion, PLLC

(57) ABSTRACT

Provided is a beam deflector including a first sub deflector configured to deflect light of a first wavelength band in a first direction and a second direction that intersects the first direction, and convert a polarization direction of the light of the first wavelength band, and a second sub deflector configured to deflect light of a second wavelength band, that is different from the first wavelength band in the first direction and the second direction, and convert a polarization direction of the light of the second wavelength band, wherein the first sub deflector and the second sub deflector are sequentially provided such that the light of the first wavelength band and the light of the second wavelength band sequentially pass through the first sub deflector and the second sub deflector.

30 Claims, 23 Drawing Sheets

BEAM DEFLECTOR, 3-DIMENSIONAL DISPLAY DEVICE INCLUDING THE SAME, AND METHOD OF DEFLECTING BEAM

CROSS-REFERENCE TO RELATED APPLICATION

This application claims priority to Korean Patent Application No. 10-2020-0033418, filed on Mar. 18, 2020 in the Korean Intellectual Property Office, the disclosure of which is incorporated herein in its entirety by reference.

BACKGROUND

1. Field

Example embodiments of the present disclosure relate to a beam deflector, a three-dimensional (3D) display device including the same, and a method of deflecting a beam.

2. Description of Related Art

A beam deflector that changes a traveling direction of light is applicable to a three-dimensional (3D) display to form directivity. To remove a scattering phenomenon in which the light deflected by the beam deflector has a minute path difference from color to color, driving of the beam deflector may be divided for each color. A scheme for division may include spatial multiplexing and time multiplexing.

Spatial multiplexing deflects a beam for each color by dividing a space, making the entire system bulky. Time multiplexing divides time to finely adjust a deflection direction in the beam deflector appropriately for each color. This scheme, however, is inconvenient in that a response speed of the beam deflector needs to be three times higher than in spatial multiplexing.

SUMMARY

Example embodiments provide a beam deflector, a three-dimensional (3D) display device including the same, and a method of deflecting a beam.

Additional aspects will be set forth in part in the description which follows and, in part, will be apparent from the description, or may be learned by practice of example embodiments.

According to an aspect of an example embodiment, there is provided a beam deflector including a first sub deflector configured to deflect light of a first wavelength band in a first direction and a second direction that intersects the first direction, and convert a polarization direction of the light of the first wavelength band, and a second sub deflector configured to deflect light of a second wavelength band, that is different from the first wavelength band in the first direction and the second direction, and convert a polarization direction of the light of the second wavelength band, wherein the first sub deflector and the second sub deflector are sequentially provided such that the light of the first wavelength band and the light of the second wavelength band sequentially pass through the first sub deflector and the second sub deflector.

The beam deflector may further include a first selective polarization conversion element configured to convert the polarization direction of the light of the first wavelength band, wherein the first selective polarization conversion element may be provided opposite to the second sub deflector with respect to the first sub deflector such that the light of the first wavelength band and the light of the second wavelength band pass through the first selective polarization conversion element and are provided to the first sub deflector.

The beam deflector may further include a polarization generation element configured to polarize unpolarized light, wherein the polarization generation element may be provided opposite to the first sub deflector with respect to the first selective polarization conversion element such that the light of the first wavelength band and the light of the second wavelength band pass through the polarization generation element and are provided to the first selective polarization conversion element, and each of the light of the first wavelength band and the light of the second wavelength band that are incident to the polarization generation element may be unpolarized light.

The first sub deflector may include a first deflection element configured to deflect light having a first polarization direction in the second direction, a first general-purpose polarization conversion element configured to convert the polarization direction of the light of the first wavelength band and the polarization direction of the light of the second wavelength band, and a second deflection element configured to deflect light having a second polarization direction that is different from the first polarization direction in the first direction, and the first deflection element, the first general-purpose polarization conversion element, and the second deflection element may be sequentially provided such that the light of the first wavelength band and the light of the second wavelength band sequentially pass through the first deflection element, the first general-purpose polarization conversion element, and the second deflection element.

The first general-purpose polarization conversion element may include a half-wave plate.

The first deflection element may include first lower electrodes provided in the second direction, a first upper electrode layer facing the first lower electrodes, and a first liquid crystal layer provided between the first lower electrodes and the first upper electrode layer, and the first liquid crystal layer may be controlled by the first lower electrodes and the first upper electrode layer and may include a first light path conversion plane configured to deflect the light having the first polarization direction in the second direction.

The second deflection element may include second lower electrodes provided in the first direction, a second upper electrode layer facing the second lower electrodes, and a second liquid crystal layer provided between the second lower electrodes and the second upper electrode layer, and the second liquid crystal layer may be controlled by the second lower electrodes and the second upper electrode layer and may include a second light path conversion plane configured to deflect the light having the second polarization direction in the first direction.

The second sub deflector may include a third deflection element configured to deflect light having the first polarization direction in the second direction, a second general-purpose polarization conversion element configured to convert the polarization direction of the light of the first wavelength band and the polarization direction of the light of the second wavelength band, and a fourth deflection element configured to deflect the light having the second polarization direction in the first direction, and the third deflection element, the second general-purpose polarization conversion element, and the fourth deflection element may be sequentially provided such that the light of the first wavelength band and the light of the second wavelength band sequentially pass through the third deflection element, the second general-purpose polarization conversion element, and the fourth deflection element.

The third deflection element may include third lower electrodes provided in the second direction, a third upper electrode layer facing the third lower electrodes, and a third liquid crystal layer provided between the third lower electrodes and the third upper electrode layer, the fourth deflection element may include fourth lower electrodes provided in the first direction, a fourth upper electrode layer facing the fourth lower electrodes, and a fourth liquid crystal layer provided between the fourth lower electrodes and the fourth upper electrode layer, the third liquid crystal layer may be controlled by the third lower electrodes and the third upper electrode layer and may include a third light path conversion plane configured to deflect the light having the first polarization direction in the second direction, and the fourth liquid crystal layer may be controlled by the fourth lower electrodes and the fourth upper electrode layer and may include a fourth light path conversion plane configured to deflect the light having the second polarization direction in the first direction.

The beam deflector may further include a third sub deflector configured to deflect light having a third wavelength band that is different from the first wavelength band and the second wavelength band, respectively, a second selective polarization conversion element configured to convert the polarization direction of the light of the first wavelength band, and a third selective polarization conversion element configured to convert the polarization direction of the light of the third wavelength band, the first sub deflector, the second selective polarization conversion element, the second sub deflector, the third selective polarization conversion element, and the third sub deflector may be sequentially provided such that the light of the first wavelength band, the light of the second wavelength band, and the light of the third wavelength band sequentially pass through the first sub deflector, the second selective polarization conversion element, the second sub deflector, the third selective polarization conversion element, and the third sub deflector.

The third sub deflector may include a fifth deflection element configured to deflect the light having the first polarization direction in the second direction, a third general-purpose polarization conversion element configured to convert the polarization direction of the light of the first wavelength band, the polarization direction of the light of the second wavelength band, and the polarization direction of the light of the third wavelength band, and a sixth deflection element configured to deflect the light having the second polarization direction in the first direction, and the fifth deflection element, the third general-purpose polarization conversion element, and the sixth deflection element may be sequentially provided such that the light of the first wavelength band, the light of the second wavelength band, and the light of the third wavelength band sequentially pass through the fifth deflection element, the third general-purpose polarization conversion element, and the sixth deflection element.

The fifth deflection element may include fifth lower electrodes provided in the second direction, a fifth upper electrode layer facing the fifth lower electrodes, and a fifth liquid crystal layer provided between the fifth lower electrodes and the fifth upper electrode layer, the sixth deflection element may include sixth lower electrodes provided in the first direction, a sixth upper electrode layer facing the sixth lower electrodes, and a sixth liquid crystal layer provided between the sixth lower electrodes and the sixth upper electrode layer, the fifth liquid crystal layer may be controlled by the fifth lower electrodes and the fifth upper electrode layer and may include a fifth light path conversion plane configured to deflect the light having the first polarization direction in the second direction, and the sixth liquid crystal layer may be controlled by the sixth lower electrodes and the sixth upper electrode layer and may include a sixth light path conversion plane configured to deflect the light having the second polarization direction in the first direction.

The beam deflector may further include a first selective polarization conversion element configured to convert the polarization direction of the light of the first wavelength band, wherein the first selective polarization conversion element may be provided opposite to the second sub deflector with respect to the first sub deflector such that the light of the first wavelength band, the light of the second wavelength band, and the light of the third wavelength band pass through the first selective polarization conversion element and are provided to the first sub deflector.

The beam deflector may further include a polarization generation element configured to polarize unpolarized light, wherein the polarization generation element may be provided opposite to the first sub deflector with respect to the first selective polarization conversion element such that the light of the first wavelength band, the light of the second wavelength band, and the light of the third wavelength band pass through the polarization generation element and are provided to the first selective polarization conversion element, and each of the light of the first wavelength band, the light of the second wavelength band, and the light of the third wavelength band that are incident to the polarization generation element may be unpolarized light.

Each of the first liquid crystal layer, the third liquid crystal layer, and the fifth liquid crystal layer may further include a first additional light path conversion plane configured to deflect the light having the first polarization direction in a fourth direction that is opposite to the second direction.

The beam deflector may further include an additional deflector configured to convert paths of the light of the first wavelength band, the light of the second wavelength band, and the light of the third wavelength band that are emitted from the third sub deflector.

The beam deflector may further include a final polarization conversion element configured to change the polarization direction of the light of the first wavelength band, the polarization direction of the light of the second wavelength band, and the polarization direction of the light of the third wavelength band to coincide with one another, wherein the final polarization conversion element may be configured to receive the light of the first wavelength band, the light of the second wavelength band, and the light of the third wavelength band that are emitted from the sixth deflection element, and to convert the polarization direction of the light of the first wavelength band, the polarization direction of the light of the second wavelength band, and the polarization direction of the light of the third wavelength band.

The beam deflector may further include at least one processor configured to control each of the first deflection element, the second deflection element, the third deflection element, the fourth deflection element, the fifth deflection element, and the sixth deflection element to deflect the light of the first wavelength band, the light of the second wavelength band, and the light of the third wavelength band.

According to another aspect of an example embodiment, there is provided a method of deflecting a beam, the method including deflecting, by a first deflection element, light of a first wavelength band having a first polarization direction in a first direction, changing, by a first general-purpose polarization conversion element, a polarization direction of the light of the first wavelength band from the first polarization direction to a second polarization direction that intersects the first polarization direction, and converting a polarization direction of light of a second wavelength band that is different from the first wavelength band from the second polarization direction to the first polarization direction, deflecting, by a second deflection element, the light of the first wavelength band having a second polarization direction in a second direction that intersects the first direction, deflecting, by a third deflection element, the light of the second wavelength band having the first polarization direction in the first direction, converting, by a second general-purpose polarization conversion element, a polarization direction of the light of the second wavelength band from the first polarization direction to the second polarization direction, and converting the polarization direction of the light of the second wavelength band from the second polarization direction to the first polarization direction, and deflecting, by a fourth deflection element, the light of the second wavelength band having the second polarization direction in the second direction, wherein the light of the first wavelength band and the light of the second wavelength band sequentially pass through the first deflection element, the first general-purpose polarization conversion element, the second deflection element, the third deflection element, the second general-purpose polarization conversion element, and the fourth deflection element.

The method may further include providing, by a first selective polarization conversion element, the light of the first wavelength band having the first polarization direction and the light of the second wavelength band having the second polarization direction to the first deflection element, wherein the first selective polarization conversion element may convert a polarization direction of the light of the first wavelength band from the second polarization direction to the first polarization direction and maintain the polarization direction of the light of the second wavelength band as the second polarization direction.

The method may further include providing, by using a polarization generation element the light of the first wavelength band having the second polarization direction and the light of the second wavelength band having the second polarization direction to the first selective polarization conversion element, by using a polarization generation element, wherein the polarization generation element may polarize, in the second polarization direction, the light of the first wavelength band which is unpolarized and the light of the second wavelength band which is unpolarized, and provide the light of the first wavelength band having the second polarization direction and the light of the second wavelength band having the second polarization direction to the first selective polarization conversion element.

The method may further include converting, by the second general-purpose polarization conversion element, a polarization direction of light of a third wavelength band that is different from the first wavelength band and the second wavelength band from the first polarization direction to the second polarization direction, converting, by a third general-purpose polarization conversion element, the polarization direction of the light of the first wavelength band from the first polarization direction to the second polarization direction, deflecting, by a fifth deflection element, the light of the third wavelength band having the first polarization direction in the first direction, converting, by a third general-purpose polarization conversion element, the polarization direction of the light of the third wavelength band from the first polarization direction to the second polarization direction, and converting the polarization direction of the light of the first wavelength band and the polarization direction of the light of the second wavelength band from the second polarization direction to the first polarization direction, and deflecting, by a sixth deflection element, the light of the third wavelength band having the second polarization direction in the second direction, wherein the light of the first wavelength band, the light of the second wavelength band, and the light of the third wavelength band sequentially pass through the first selective polarization conversion element, the first deflection element, the first general-purpose polarization conversion element, the second deflection element, a second selective polarization conversion element, the third deflection element, the second general-purpose polarization conversion element, the fourth deflection element, a third selective polarization conversion element, the fifth deflection element, the third general-purpose deflection conversion element, and the sixth deflection element, the first selective polarization conversion element maintains the polarization direction of the light of the third wavelength band as the second wavelength band, the first general-purpose polarization conversion element converts the polarization direction of the light of the third wavelength band from the second polarization direction to the first polarization direction, and the second general-purpose polarization conversion element converts the polarization direction of the light of the third wavelength band from the second polarization direction to the first polarization direction.

The method may further include changing, by a final polarization conversion element, the polarization directions of the light of the first wavelength band, the light of the second wavelength band, and the light of the third wavelength band to coincide with each other.

The method may further include converting, by an additional deflection element, paths of the light of the first wavelength band, the light of the second wavelength band, and the light of the third wavelength band that are emitted from the sixth deflection element.

The method may further include controlling, by at least one processor, the first deflection element, the second deflection element, the third deflection element, the fourth deflection element, the fifth deflection element, and the sixth deflection element.

According to yet another aspect of an example embodiment, there is provided a three-dimensional (3D) display device including a light source configured to emit a light beam including a plurality of wavelength band, a beam deflector configured to deflect the light beam, at least one processor configured to control the beam deflector to deflect light in a predetermined direction, and a spatial light modulator configured to diffract the light beam to form a holographic image, wherein the beam deflector includes a first sub deflector configured to deflect light having a first wavelength band in a first direction and a second direction that intersects the first direction, and convert a polarization direction of the light of the first wavelength band, and a second sub deflector configured to deflect light having a second wavelength band that is different from the first wavelength band in the first direction and the second direction, and convert a polarization direction of the light of the second wavelength band, wherein the first sub deflector and the second sub deflector are provided in a path of the light beam emitted from the light source.

The first sub deflector may include a first deflection element configured to deflect light having a first polarization direction in the second direction, a first general-purpose polarization conversion element configured to convert the polarization direction of the light of the first wavelength band and the polarization direction of the light of the second wavelength band, and a second deflection element configured to deflect light having a second polarization direction that is different from the first polarization direction in the first direction, and wherein the second sub deflector may include a third deflection element configured to deflect light having the first polarization direction in the second direction, a second general-purpose polarization conversion element configured to convert the polarization direction of the light of the first wavelength band and the polarization direction of the light of the second wavelength band, and a fourth deflection element configured to deflect the light having the second polarization direction in the first direction.

The 3D display device may further include a third sub deflector configured to deflect light having a third wavelength band that is different from the first wavelength band and the second wavelength band, respectively, in the first direction and the second direction, a first selective polarization conversion element configured to selectively convert the polarization direction of the light of the first wavelength band, a second selective polarization conversion element configured to selectively convert the polarization direction of the light of the third wavelength band, and a third selective polarization conversion element configured to selectively convert the polarization direction of the light of the first wavelength band, wherein the first selective polarization conversion element, the first sub deflector, the second selective polarization conversion element, the second sub deflector, the third selective polarization conversion element, and the third sub deflector may be sequentially provided such that the light beam sequentially passes through the first selective polarization conversion element, the first sub deflector, the second selective polarization conversion element, the second sub deflector, the third selective polarization conversion element, and the third sub deflector.

The 3D display device may further include a final polarization conversion element configured to change the polarization direction of the light of the first wavelength band, the polarization direction of the light of the second wavelength band, and the polarization direction of the light of the third wavelength band to coincide with each other, wherein the final polarization conversion element may be configured to receive the light of the first wavelength band, the light of the second wavelength band, and the light of the third wavelength band that are emitted from the third sub deflector, and to convert the polarization direction of the light of the first wavelength band, the polarization direction of the light of the second wavelength band, and the polarization direction of the light of the third wavelength band.

The first sub deflector, the second sub deflector, and the third sub deflector may be configured to split the light of the first wavelength band, the light of the second wavelength band, and the light of the third wavelength band, respectively, wherein the light of the first wavelength band may be split by the first sub deflector into light deflected in the first direction and the second direction and light deflected in the second direction and a direction opposite to the first direction, wherein the light of the second wavelength band may be split by the second sub deflector into light deflected in the first direction and the second direction and light deflected in the second direction and the direction opposite to the first direction, and wherein the light of the third wavelength band may be split by the third sub deflector into light deflected in the first direction and the second direction and light deflected in the second direction and the direction opposite to the first direction.

According to yet another aspect of an example embodiment, there is provided a beam deflector including a first sub deflector configured to deflect light of a first wavelength band in a first direction and a second direction that intersects the first direction, and convert a polarization direction of the light of the first wavelength band, a second sub deflector configured to deflect light of a second wavelength band, that is different from the first wavelength band in the first direction and the second direction, and convert a polarization direction of the light of the second wavelength band, and a third sub deflector configured to deflect light having a third wavelength band that is different from the first wavelength band and the second wavelength band, respectively, and convert the polarization direction of the light of the first wavelength band, the polarization direction of the light of the second wavelength band, and a polarization direction of the light of the third wavelength band, wherein the first sub deflector, the second sub deflector, and the third sub deflector are sequentially provided such that the light of the first wavelength band, the light of the second wavelength band, and light of the third wavelength band sequentially pass through the first sub deflector, the second sub deflector, and the third sub deflector

BRIEF DESCRIPTION OF THE DRAWINGS

The above and/or other aspects, features, and advantages of certain example embodiments will be more apparent from the following description taken in conjunction with the accompanying drawings, in which.

DETAILED DESCRIPTION

Figure 1:
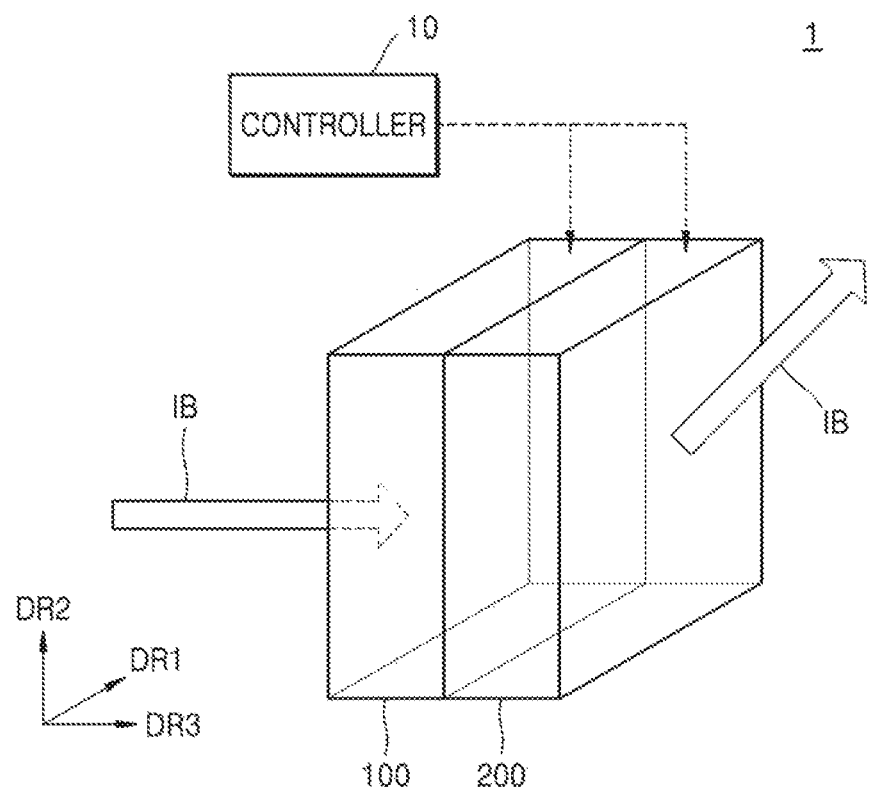
FIG. 1 is a perspective view of a beam deflector according to an example embodiment.

Example embodiments will now be described in detail with reference to the accompanying drawings, wherein like reference numerals refer to like elements throughout. In this regard, the example embodiments may have different forms and should not be construed as being limited to the descriptions set forth herein. Accordingly, the example embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Hereinafter, example embodiments will be described in detail with reference to the accompanying drawings. The following example embodiments are merely illustrative, and various modifications may be possible from the example embodiments. Throughout the drawings, like reference numerals refer to like elements, and each element may be exaggerated in size for clarity and convenience of a description.

An expression such as "above" or "on" may include not only the meaning of "immediately on in a contact manner", but also the meaning of "on in a non-contact manner".

As used herein, the singular forms are intended to include the plural forms as well, unless the context clearly indicates otherwise. When it is assumed that a certain part includes a certain component, the term "including" means that a corresponding component may further include other components unless a specific meaning opposed to the corresponding component is written.

The use of "the" and other demonstratives similar thereto may correspond to both a singular form and a plural form.

Herein, deflection of light in a direction may mean that a traveling direction of the light newly has a component of the direction or more components. For example, when light traveling in a third direction is deflected in a first direction, the light may travel in a combined direction of the first direction and the third direction.

Steps of a method may be performed in a proper order unless there is no explicit mentioning that the steps have to be performed in an order they described. The use of all exemplary terms (e.g., "etc.,", "and (or) the like", and "and so forth") is merely intended to described technical spirit in detail, and the scope is not necessarily limited by the examples or exemplary terms unless defined by the claims.

Figure 2:
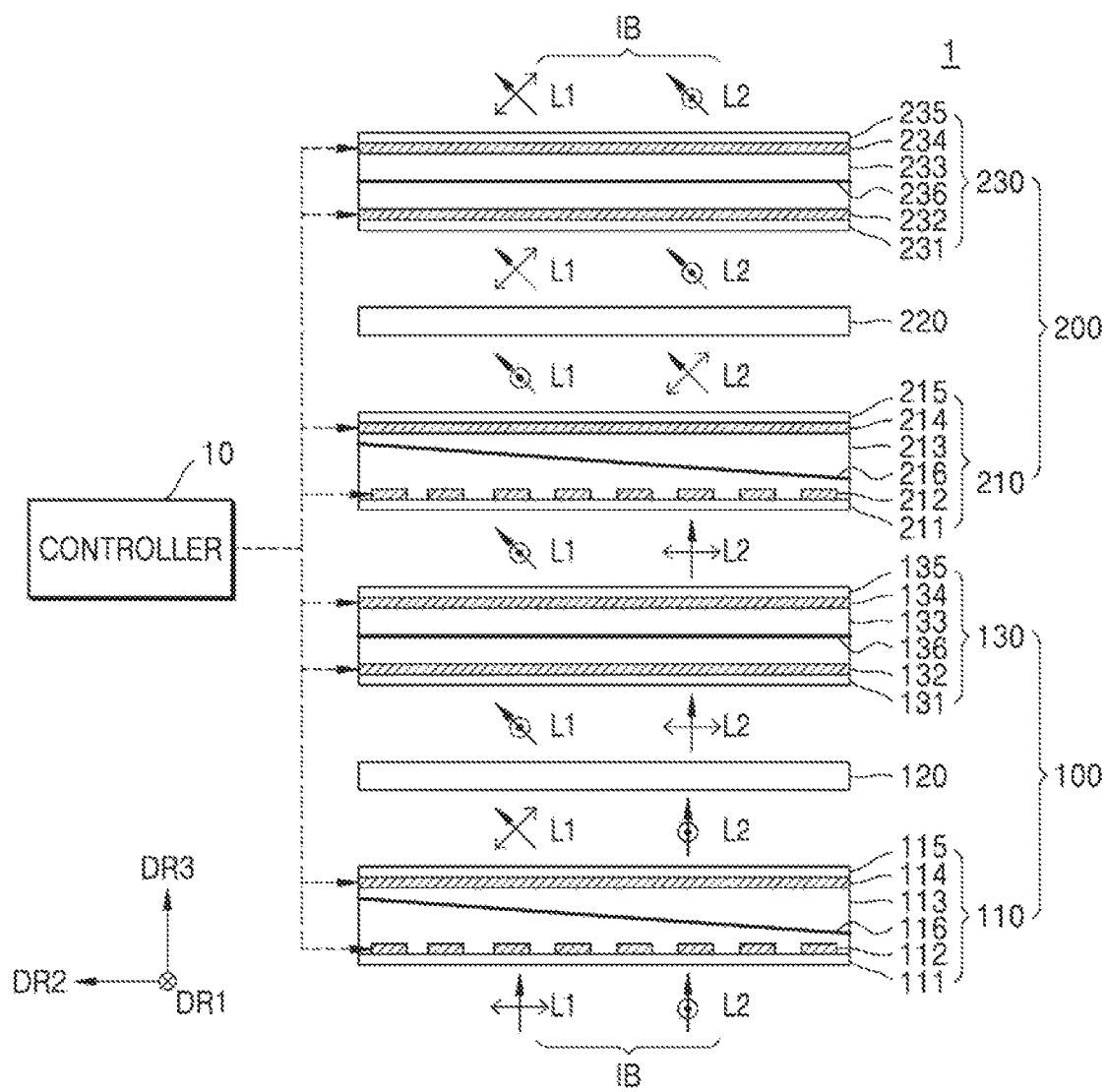
FIG. 2 is a conceptual view of a beam deflector of FIG. 1, viewed in a first direction.
Figure 3:
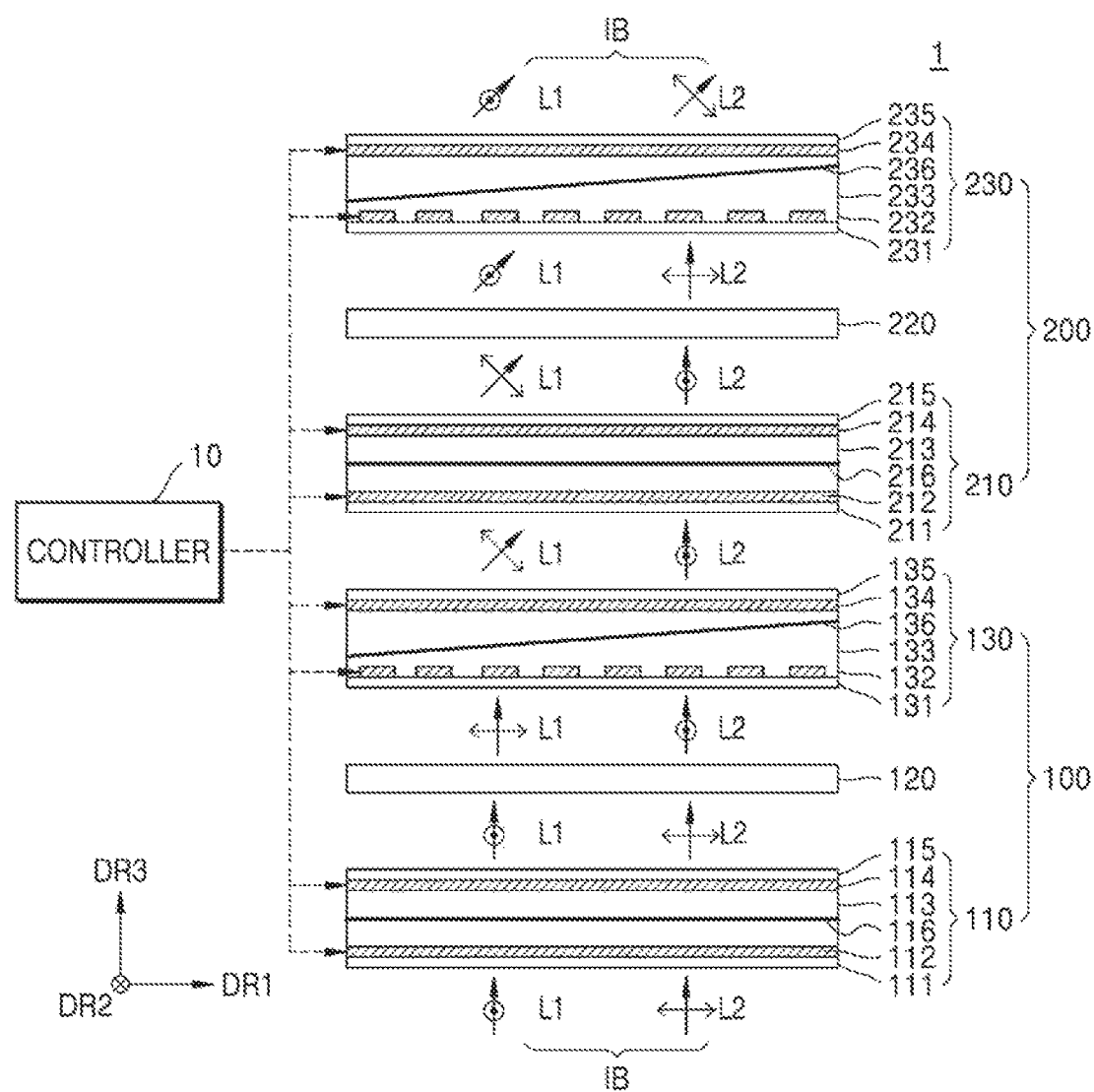
FIG. 3 is a conceptual view of a beam deflector of FIG. 1, viewed in a second direction.

FIG. 1 is a perspective view of a beam deflector according to an example embodiment. FIG. 2 is a conceptual view of the beam defector of FIG. 1, viewed in the first direction. FIG. 3 is a conceptual view of the beam defector of FIG. 1, viewed in a second direction.

Referring to FIGS. 1 through 3, a beam deflector 1 may be provided which includes a first sub-deflector 100, a second sub-deflector 200, and a controller 10. The controller 10 may include at least one processor that may execute the respective functions through controls of one or more microprocessors. A beam IB may be incident to the first sub-deflector 100. The beam IB may sequentially pass through the first sub-deflector 100 and the second sub-deflector 200. The beam IB may be deflected by the beam deflector 1. The beam IB may include first light L1 having a first wavelength band and second light L2 having a second wavelength band. The first wavelength band and the second wavelength band may be different from each other.

The second light L2 incident to the first sub-deflector 100 may have a second polarization direction (e.g., denoted by ⊙ in FIG. 2 or ↔ in FIG. 3). The second polarization direction may be parallel with a first direction DR1. The first light L1 incident to the first sub-deflector 100 may have a first polarization direction (e.g., denoted by ↔ in FIG. 2 or ⊙ in FIG. 3). The first polarization direction may be parallel with a second direction DR2. The beam IB including the first light L1 and the second light L2 may be incident to the first sub-deflector 100 in a third direction DR3 that intersects the first direction DR1 and the second direction DR2. For example, the first direction DR1, the second direction DR2, and the third direction DR3 may be perpendicular to one another.

The first sub-deflector 100 may deflect the first light L1. The first sub-deflector 100 may include a first deflection element 110, a first general-purpose polarization conversion element 120, and a second deflection element 130. The first light L1 and the second light L2 may sequentially pass through the first deflection element 110, the first general-purpose polarization conversion element 120, and the second deflection element 130. For example, the first deflection element 110, the first general-purpose polarization conversion element 120, and the second deflection element 130 may be arranged in the third direction DR3.

The first deflection element 110 may include a first lower substrate 111, first lower electrodes 112, a first upper electrode layer 114, a first upper substrate 115, and a first liquid crystal layer 113. The first lower substrate 111 and the first upper substrate 115 may face each other. The first lower substrate 111 and the first upper substrate 115 may include an insulating material. For example, the first lower substrate 111 and the first upper substrate 115 may include glass or transparent plastic.

The first lower electrodes 112 may be provided on the first lower substrate 111. The first lower electrodes 112 may be arranged in the second direction DR2 and may extend in the first direction DR1. Driving voltages may be applied to the first lower electrodes 112 by the controller 10. Sizes and polarities of the driving voltages may be independently adjusted by the controller 10. For example, the first lower electrodes 112 may include a transparent conductive material. For example, the first lower electrodes 112 may include indium-tin-oxide (ITO), indium-zinc-oxide (IZO), indium-tin-zinc-oxide (ITZO), or combinations thereof.

The first upper electrode 114 may be provided under the first upper substrate 115. The first upper electrode layer 114 may face the first lower electrodes 112 between the first lower substrate 111 and the first upper substrate 115. For example, the first upper electrode layer 114 may include a single electrode. A common voltage may be applied to the first upper electrode layer 114 by the controller 10. A size and a polarity of the common voltage may be adjusted by the controller 10. For example, the first upper electrode layer 114 may include a transparent conductive material. For example, the first upper electrode layer 114 may include ITO, IZO, ITZO, or combinations thereof.

The first liquid crystal layer 113 may be provided between the first lower electrodes 112 and the first upper electrode layer 114. The first liquid crystal layer 113 may include liquid crystal molecules. The liquid crystal molecules may create a first light path conversion plane 116 in the first liquid crystal layer 113. The first light path conversion plane 116 may be an interface on which a refractive index change occurs in the first liquid crystal layer 113. The first light path conversion plane 116 may be formed as arrangement of the liquid crystal molecules change due to a voltage difference between the first lower electrodes 112 and the first upper electrode layer 114. The first light path conversion plane 116 may refract light passing therethrough. Formation of the first light path conversion plane 116 may result from a difference between a refractive index of the liquid crystal molecules in a major-axis direction and a refractive index thereof in a minor-axis direction. This is because the liquid crystal molecules have different refractive indices with respect to light of polarization parallel to a major axis and light of polarization parallel to a perpendicular direction to the light among of light incident on the liquid crystal molecules. A slope of the first light path conversion plane 116 may be adjusted based on driving voltages applied to the first lower electrodes 112 in the first lower electrodes 112.

The first light path conversion plane 116 may deflect light having the first polarization direction in the second direction DR2. For example, the first light path conversion plane 116 may deflect the first light L1 in the second direction DR2. The first light L1 passing through the first light path conversion plane 116 may travel in a combined direction of the third direction DR3 and the second direction DR2.

The first light path conversion plane 116 may maintain a path of light having a polarization direction that is different from the first polarization direction. For example, the first light path conversion plane 116 may maintain a path of the second light L2 having the first polarization direction. For example, the first light path conversion plane 116 may not deflect the second light L2.

The first light L1 may be deflected in the second direction DR2 by the first deflection element 110. The first light L1 passing through the first deflection element 110 may have the first polarization direction. The second light L2 may not be deflected by the first deflection element 110. The second light L2 passing through the first deflection element 110 may have the second polarization direction.

The first general-purpose polarization conversion element 120 may convert the polarization direction of light passing therethrough. The first general-purpose polarization conversion element 120 may change or convert the first polarization direction into the second polarization direction. For example, the first general-purpose polarization conversion element 120 may convert the polarization direction of the first light L1 into the second polarization direction. The first general-purpose polarization conversion element 120 may convert the second polarization direction into the first polarization direction. For example, the first general-purpose polarization conversion element 120 may convert the polarization direction of the second light L2 into the first polarization direction. For example, the first general-purpose polarization conversion element 120 may include a half-wave plate.

The second deflection element 130 may include a second lower substrate 131, second lower electrodes 132, a second upper electrode layer 134, a second liquid crystal layer 133, and a second upper substrate 135. The second lower substrate 131 and the second upper substrate 135 may be substantially the same as the first lower substrate 111 and the first upper substrate 115, respectively.

The second lower electrodes 132 may be substantially the same as the first lower electrodes 112, except for an arrangement direction. The second lower electrodes 132 may be arranged in the first direction DR1 and extend in the second direction DR2. The second upper electrode layer 134 may be substantially the same as the first upper electrode layer 114.

The second liquid crystal layer 133 may be substantially the same as the first liquid crystal layer 113. As the second lower electrodes 132 may be arranged in the first direction DR1, the second liquid crystal layer 133 may have a second light path conversion plane 136 that is different from the first light path conversion plane 116. The second light path conversion plane 136 may deflect light having the second polarization direction in the first direction DR1. For example, the second light path conversion plane 136 may deflect the first light L1 in the first direction DR1. The first light L1 passing through the second light path conversion plane 136 may travel in a combined direction of the third direction DR3, the first direction DR1, and the second direction DR2.

The second light path conversion plane 136 may maintain the path of the light having a polarization direction that is different from the second polarization direction. For example, the second light path conversion plane 136 may maintain the path of the second light L2 having the first polarization direction. For example, the second light path conversion plane 136 may not deflect the second light L2.

The first light L1 may be deflected in the first direction DR1 by the second deflection element 130. The first light L1 passing through the second deflection element 130 may have the second polarization direction. The second light L2 may not be deflected by the second deflection element 130. The second light L2 passing through the second deflection element 130 may have the first polarization direction.

The second sub-deflector 200 may deflect the second light L2. The second sub-deflector 200 may include a third deflection element 210, a second general-purpose polarization conversion element 220, and a fourth deflection element 230. The first light L1 and the second light L2 may sequentially pass through the third deflection element 210, the second general-purpose polarization conversion element 220 and the fourth deflection element 230. For example, the third deflection element 210, the second general-purpose polarization conversion element 220, and the fourth deflection element 230 may be arranged in the third direction DR3.

The third deflection element 210 may include a third lower substrate 211, third lower electrodes 212, a third upper electrode layer 214, a third liquid crystal layer 213, and a third upper substrate 215. The third lower electrodes 212, the third upper electrode layer 214, and the third liquid crystal layer 213 may be substantially the same as the first lower electrodes 112, the first upper electrode layer 114, and the first liquid crystal layer 113, respectively. The third lower electrodes 212 may be arranged in the second direction DR2 and extend in a first direction DR1.

The third liquid crystal layer 213 may include a third light path conversion plane 216. The third light path conversion plane 216 may deflect light having the first polarization direction in the second direction DR2. For example, the third light path conversion plane 216 may deflect the second light L2 in the second direction DR2. The second light L2 passing through the second light path conversion plane 136 may travel in a combined direction of the third direction DR3 and the second direction DR2.

The third light path conversion plane 216 may maintain a path of light having a polarization direction that is different from the first polarization direction. For example, the third light path conversion plane 216 may maintain the path of the first light L1 having the second polarization direction. For example, the third light path conversion plane 216 may not deflect the first light L1.

The second light L2 may be deflected in the second direction DR2 by the third deflection element 210. The second light L2 passing through the third deflection element 210 may have the first polarization direction. The first light L1 may not be deflected by the third deflection element 210. The first light L1 passing through the third deflection element 210 may have the second polarization direction.

The second general-purpose polarization conversion element 220 may convert the polarization direction of light passing therethrough. The second general-purpose polarization conversion element 220 may convert the first polarization direction into the second polarization direction. For example, the second general-purpose polarization conversion element 220 may convert the polarization direction of the second light L2 into the second polarization direction. The second general-purpose polarization conversion element 220 may convert the second polarization direction into the first polarization direction. For example, the second general-purpose polarization conversion element 220 may convert the polarization direction of the first light L1 into the second polarization direction. For example, the second general-purpose polarization conversion element 220 may include a half-wave plate.

The fourth deflection element 230 may include a fourth lower substrate 231, fourth lower electrodes 232, a fourth upper electrode layer 234, a fourth liquid crystal layer 233, and a fourth upper substrate 235. The fourth lower electrodes 232, the fourth upper electrode layer 234, and the fourth liquid crystal layer 233 may be substantially the same as the second lower electrodes 132, the second upper electrode layer 134, and the second liquid crystal layer 133, respectively. The fourth lower electrodes 232 in the fourth lower electrodes 232 may be arranged in the first direction DR1 and extend in the second direction DR2.

The fourth liquid crystal layer 233 may include a fourth light path conversion plane 236. The fourth light path conversion plane 236 may deflect light having the second polarization direction in the first direction DR1. For example, the fourth light path conversion plane 236 may deflect the second light L2 in the first direction DR1. The second light L2 passing through the fourth light path conversion plane 236 may travel in a combined direction of the third direction DR3, the first direction DR1, and the second direction DR2.

The fourth light path conversion plane 236 may maintain the path of the light having a polarization direction that is different from the second polarization direction. For example, the fourth light path conversion plane 236 may maintain the path of the first light L1 having the first polarization direction. For example, the fourth light path conversion plane 236 may not deflect the first light L1.

The second light L2 may be deflected in the first direction DR1 by the fourth deflection element 230. The second light L2 passing through the fourth deflection element 230 may have the second polarization direction. The first light L1 may not be deflected by the fourth deflection element 230. The first light L1 passing through the fourth deflection element 230 may have the first polarization direction.

The controller 10 may independently control the first detection element 110, the second detection element 130, the third deflection element 210, and the fourth deflection element 230. For example, to deflect a beam IB incident to the beam deflector 1 in the third direction DR3 to a combined direction of the second direction DR2 and the third direction DR3, the controller 10 may apply a voltage to the first deflection element 110 and the third deflection element 210 and may not apply a voltage to the second deflection element 130 and the fourth deflection element 230. For example, to deflect the beam IB incident to the beam deflector 1 in the third direction DR3 to a combined direction of the first direction DR1 and the third direction DR3, the controller 10 may not apply a voltage to the first deflection element 110 and the third deflection element 210 and may apply a voltage to the second deflection element 130 and the fourth deflection element 230. For example, to deflect the beam IB incident to the beam deflector 1 in the third direction DR3 to combined directions of the first direction DR1, the second direction DR2, and the third direction DR3, the controller 10 may not apply a voltage to the first deflection element 110, the second deflection element 130, the third deflection element 210, and the fourth deflection element 230.

According to example embodiments, the beam deflector 1 may control a traveling direction of light having different wavelength bands. The first light L1 and the second light L2 having different wavelength bands may be deflected by the first sub-deflector 100 and the second sub-deflector 200, respectively. The first light L1 may be deflected in the first direction DR1, the second direction DR2, or a combined direction thereof. Thus, the first light L1 may travel in the combined direction of the third direction DR3 and the first direction DR1, in the combined direction of the third direction DR3 and the second direction DR2, or in the combined direction of the first direction DR1, the second direction DR2, and the third direction DR3. The second light L2 may be deflected in the first direction DR1, the second direction DR2, or a combined direction thereof. Thus, the second light L2 may travel in the combined direction of the third direction DR3 and the first direction DR1, in the combined direction of the third direction DR3 and the second direction DR2, or in the combined direction of the first direction DR1, the second direction DR2, and the third direction DR3.

According to an example embodiment, the beam deflector 1 may be miniaturized when compared to a beam deflector using spatial multiplexing. According to an example embodiment, the beam deflector 1 may not require a high response speed unlike a beam deflector using time multiplexing.

Figure 4:
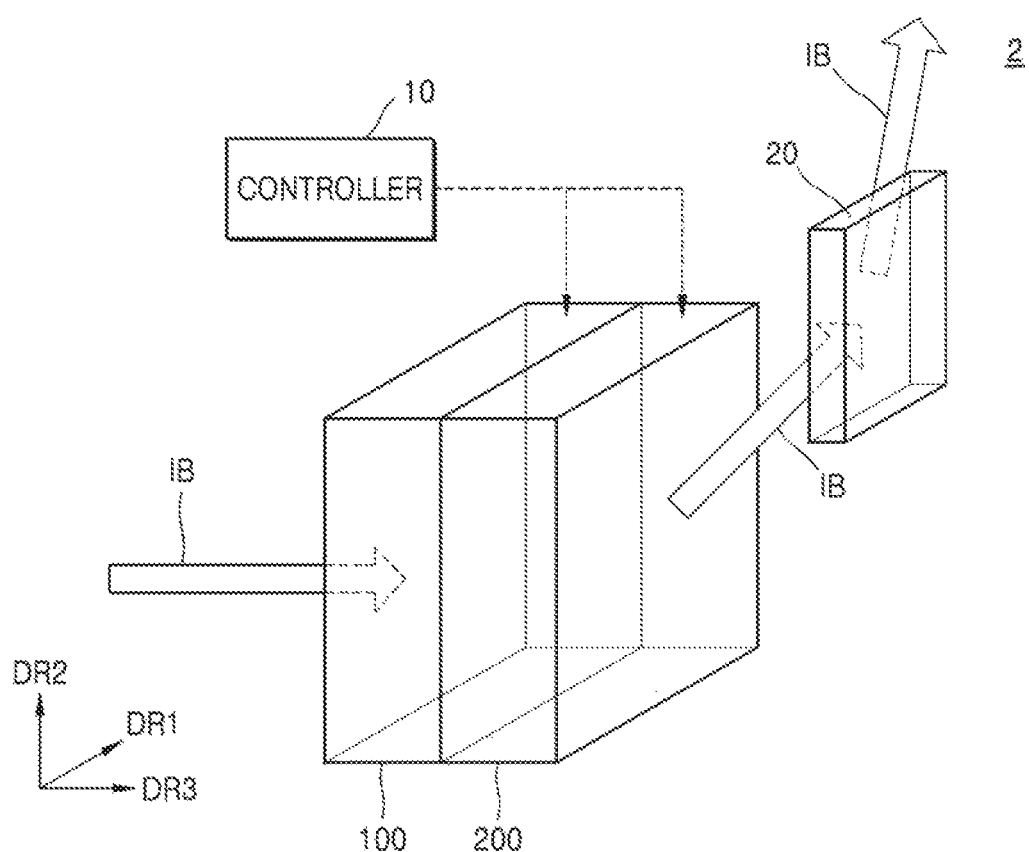
FIG. 4 is a perspective view of a beam deflector according to an example embodiment.
Figure 5:
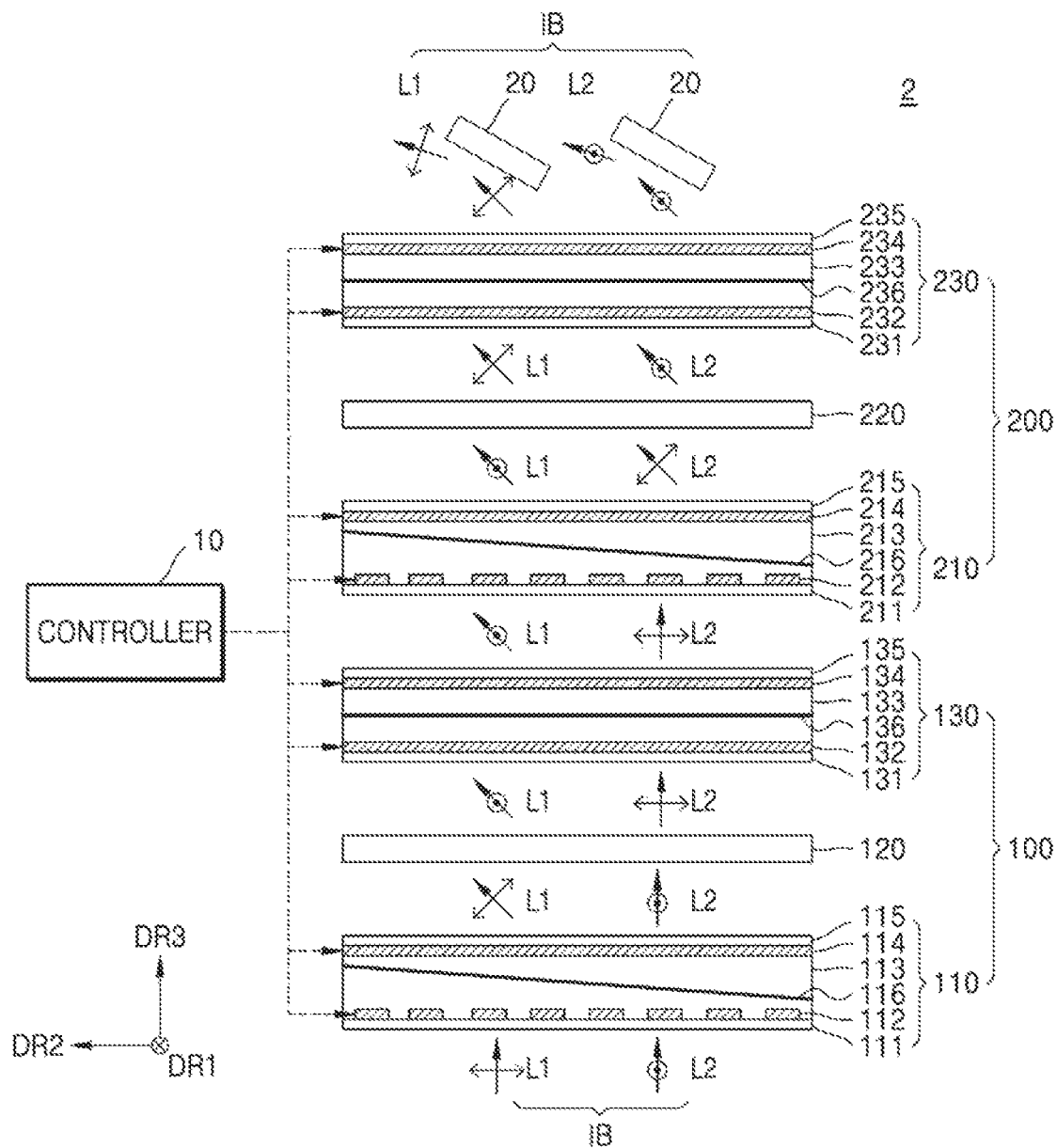
FIG. 5 is a conceptual view of a beam deflector of FIG. 4, viewed in a first direction.
Figure 6:
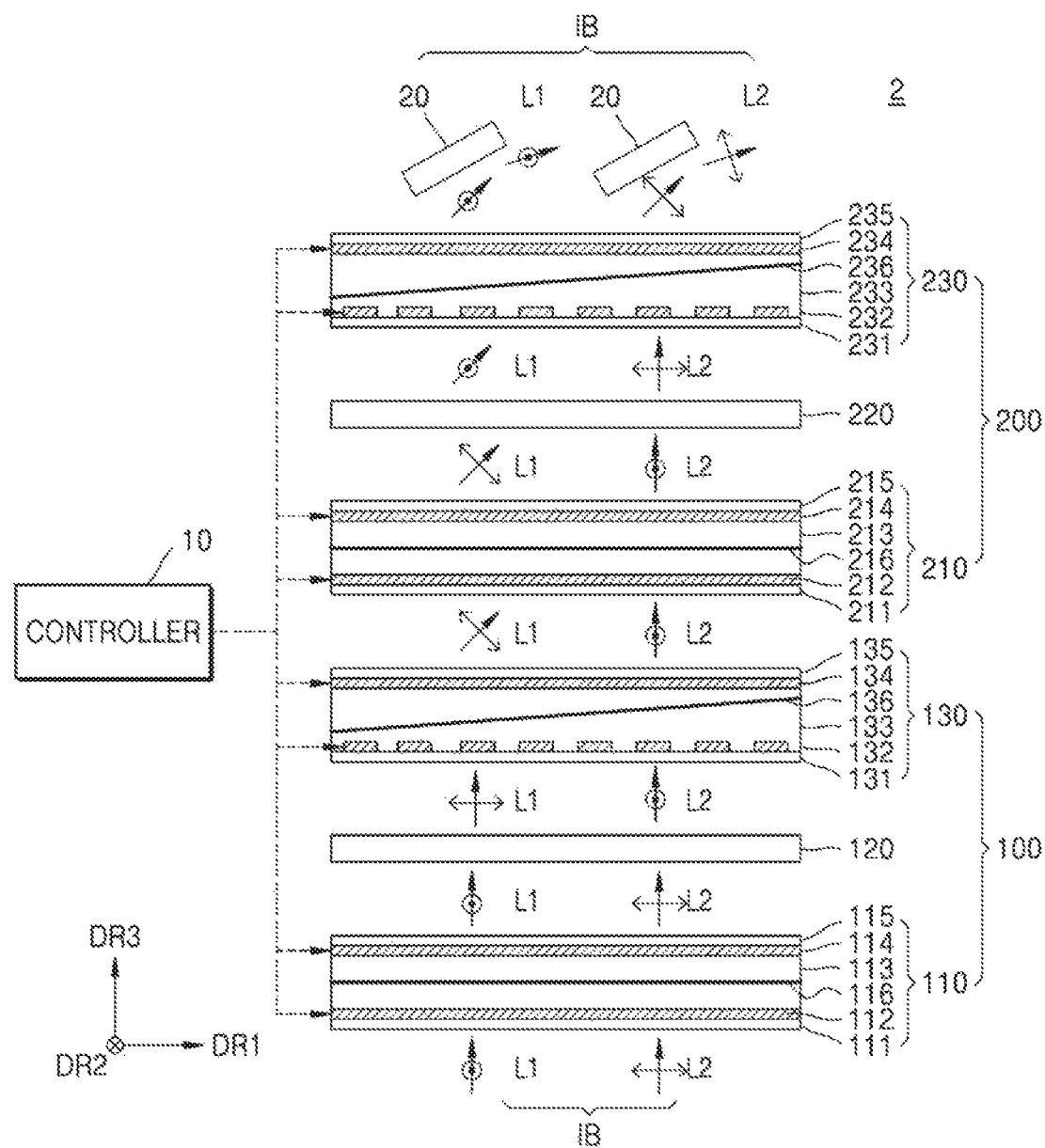
FIG. 6 is a conceptual view of a beam deflector of FIG. 4, viewed in a second direction.

FIG. 4 is a perspective view of a beam deflector 2 according to an example embodiment. FIG. 5 is a conceptual view of the beam defector 2 of FIG. 4, viewed in a first direction. FIG. 6 is a conceptual view of the beam defector 2 of FIG. 4, viewed in a second direction. For brevity of a description, matters that are substantially the same as those described above with reference to FIGS. 1 through 3 will not be described.

Referring to FIGS. 4 through 6, the beam deflector 2 may be provided which includes the first sub-deflector 100, the second sub-deflector 200, an additional deflection element 20, and the controller 10. The first sub-deflector 100 and the second sub-deflector 200 may be substantially the same as the first sub-deflector 100 and the second sub-deflector 200 described with reference to FIGS. 1 through 3.

The additional deflector 20 may be provided on a side opposite to the first sub-deflector 100 with respect to the second sub-deflector 200. The beam IB may be provided to the additional deflection element 20 through the first sub-deflector 100 and the second sub-deflector 200. For example, the first sub-deflector 100, the second sub-deflector 200, and the additional deflection element 20 may be arranged in the third direction DR3. The additional deflector 20 may change or convert a light path of the beam IB passing through the second sub-deflector 200. For example, the additional deflector 20 may include a dichroic mirror. A slope of the additional deflection element 20 with respect to the beam IB may be controlled by the controller 10.

According to an example embodiment, the beam deflector 2 including the additional deflection element 20 may deflect light in a required direction.

Figure 7:
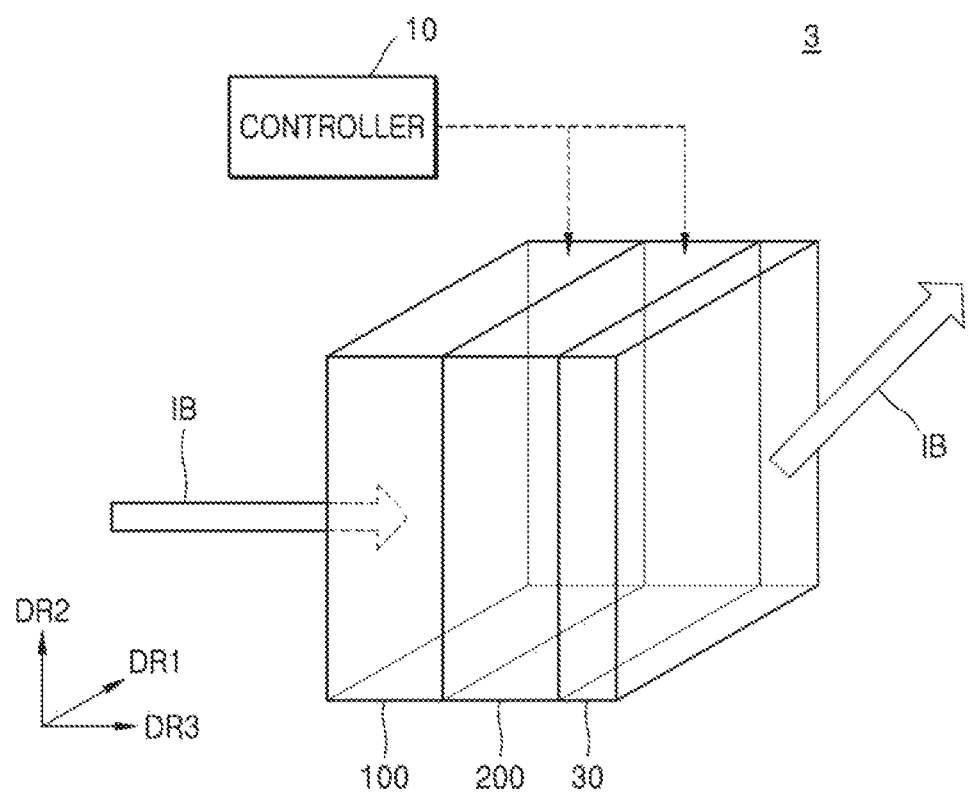
FIG. 7 is a perspective view of a beam deflector according to an example embodiment.
Figure 8:
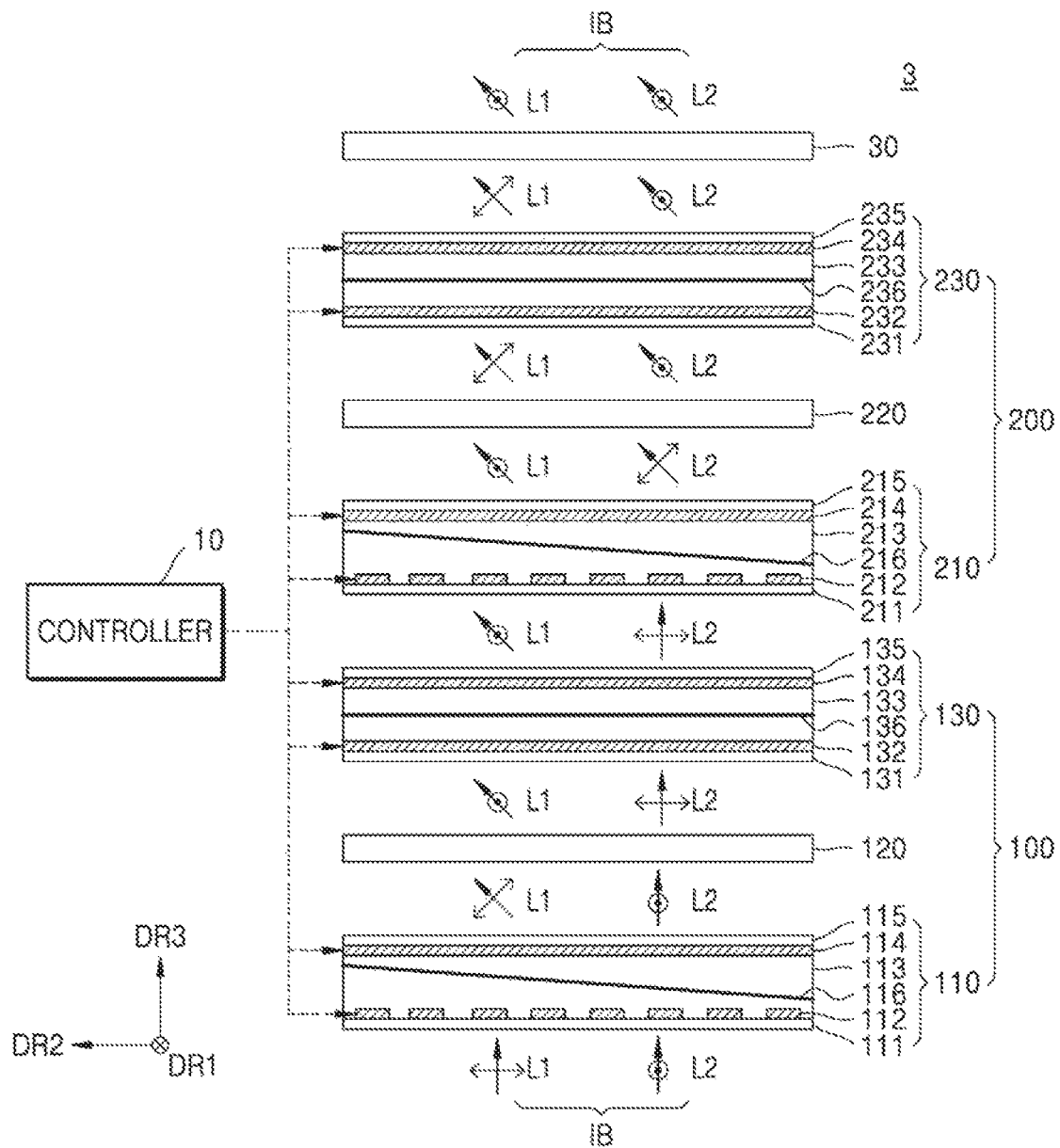
FIG. 8 is a conceptual view of a beam deflector of FIG. 7, viewed in a first direction.
Figure 9:
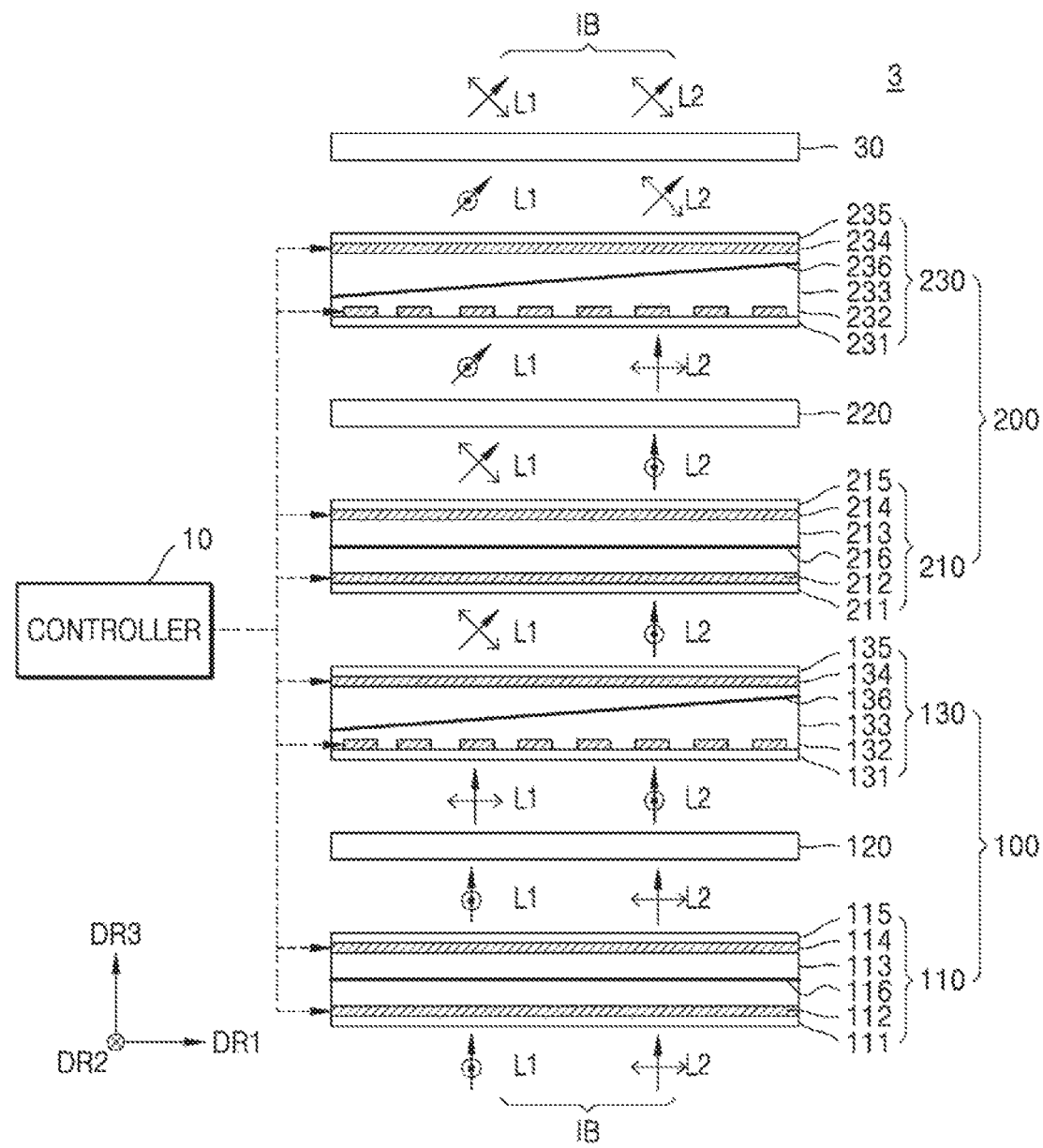
FIG. 9 is a conceptual view of a beam defector of FIG. 7, viewed in a second direction.

FIG. 7 is a perspective view of a beam deflector 3 according to an example embodiment. FIG. 8 is a conceptual view of the beam defector 3 of FIG. 7, viewed in the first direction. FIG. 9 is a conceptual view of the beam defector 3 of FIG. 7, viewed in the second direction. For brevity of a description, matters that are substantially the same as those described above with reference to FIGS. 1 through 3 will not be described.

Referring to FIGS. 7 through 9, the beam deflector 3 may be provided which includes the first sub-deflector 100, the second sub-deflector 200, a final polarization conversion element 30, and the controller 10. The first sub-deflector 100, the second sub-deflector 200, and the controller 10 may be substantially the same as the first sub-deflector 100, the second sub-deflector 200, and the controller 10 described with reference to FIGS. 1 through 3.

The final polarization deflection element 30 may be provided on a side opposite to the first sub-deflector 100 with respect to the second sub-deflector 200. The beam IB may sequentially pass through the first sub-deflector 100, the second sub-deflector 200, and the final polarization conversion element 30. For example, the first sub-deflector 100, the second sub-deflector 200, and the final polarization conversion element 30 may be arranged in the third direction DR3. As described with reference to FIGS. 1 through 3, the first light L1 and the second light L2 passing through the second sub-deflector 200 may have the first polarization direction (e.g., denoted by ↔ in FIG. 8 or ⊙ in FIG. 9) and the second polarization direction (e.g., denoted by ⊙ in FIG. 8 or ↔ in FIG. 9), respectively.

The final polarization conversion element 30 may convert a polarization direction of light of a certain wavelength band. For example, the final polarization conversion element 30 may include optically anisotropic polymer or an inorganic material having wavelength selectivity. The optically anisotropy may be a property having a refractive index that differs with polarization of incident light. The optically anisotropic material having wavelength selectivity may be applied to convert polarization of light of a certain wavelength band. The final polarization conversion element 30 may convert the first polarization direction into the second polarization direction or the second polarization direction into the first polarization direction. For example, the final polarization conversion element 30 may convert the polarization direction of the first light L1 into the second polarization direction as illustrated in FIG. 8. In another example, the final polarization conversion element 30 may convert the polarization direction of the second light L2 into the first polarization direction as illustrated in FIG. 9. Thus, the polarization direction of the first light L1 and the polarization direction of the second light L2 may coincide with each other.

According to an example embodiment, the beam deflector 3 may have different wavelength bands and emit the first light L1 and the second light L2.

Figure 10:
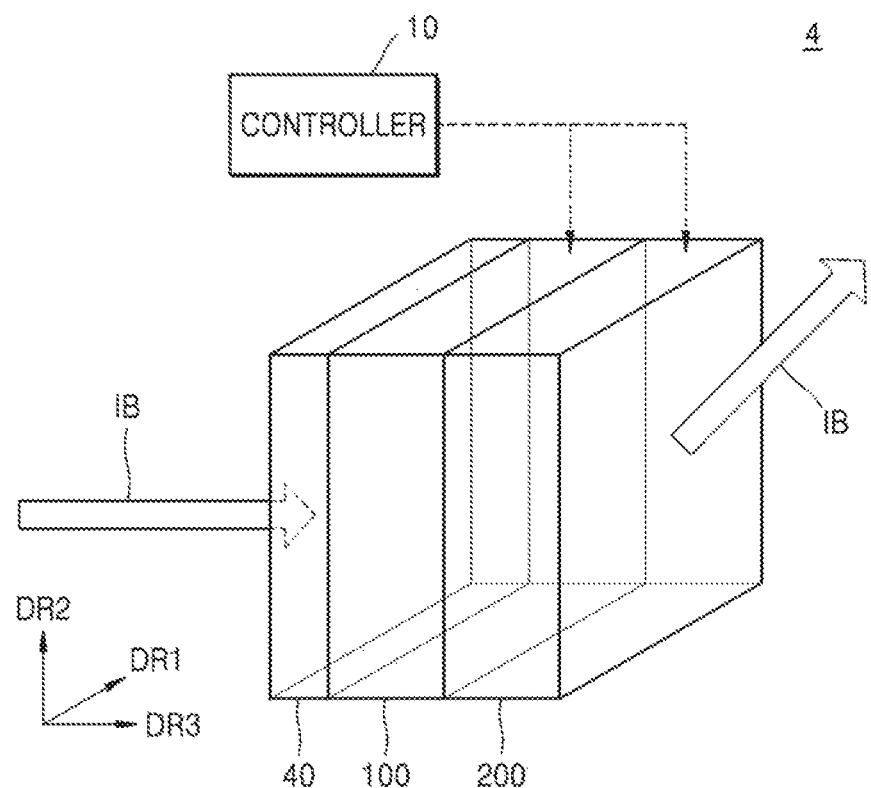
FIG. 10 is a perspective view of a beam deflector according to an example embodiment.
Figure 11:
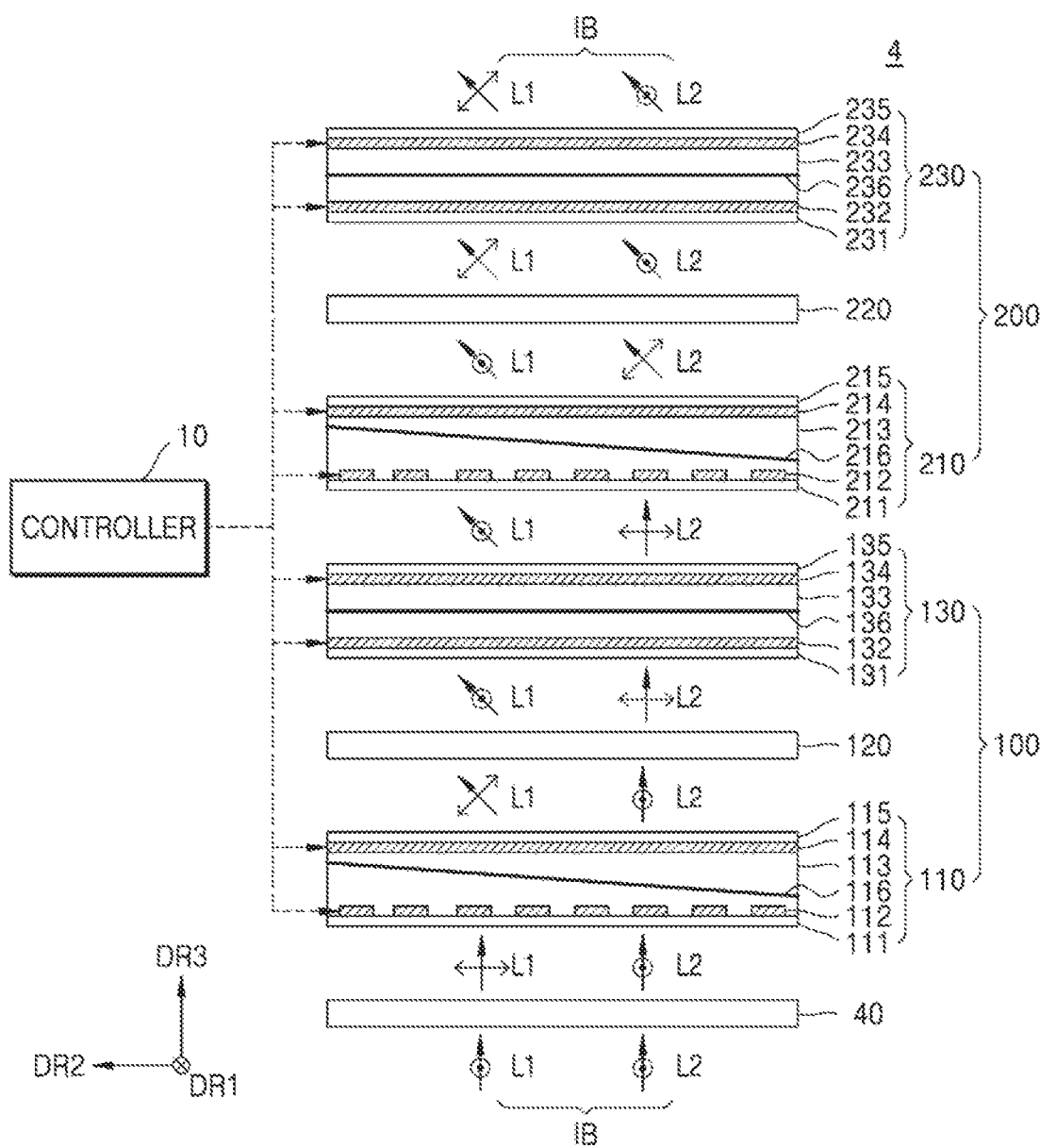
FIG. 11 is a conceptual view of a beam deflector of FIG. 10, viewed in a first direction.
Figure 12:
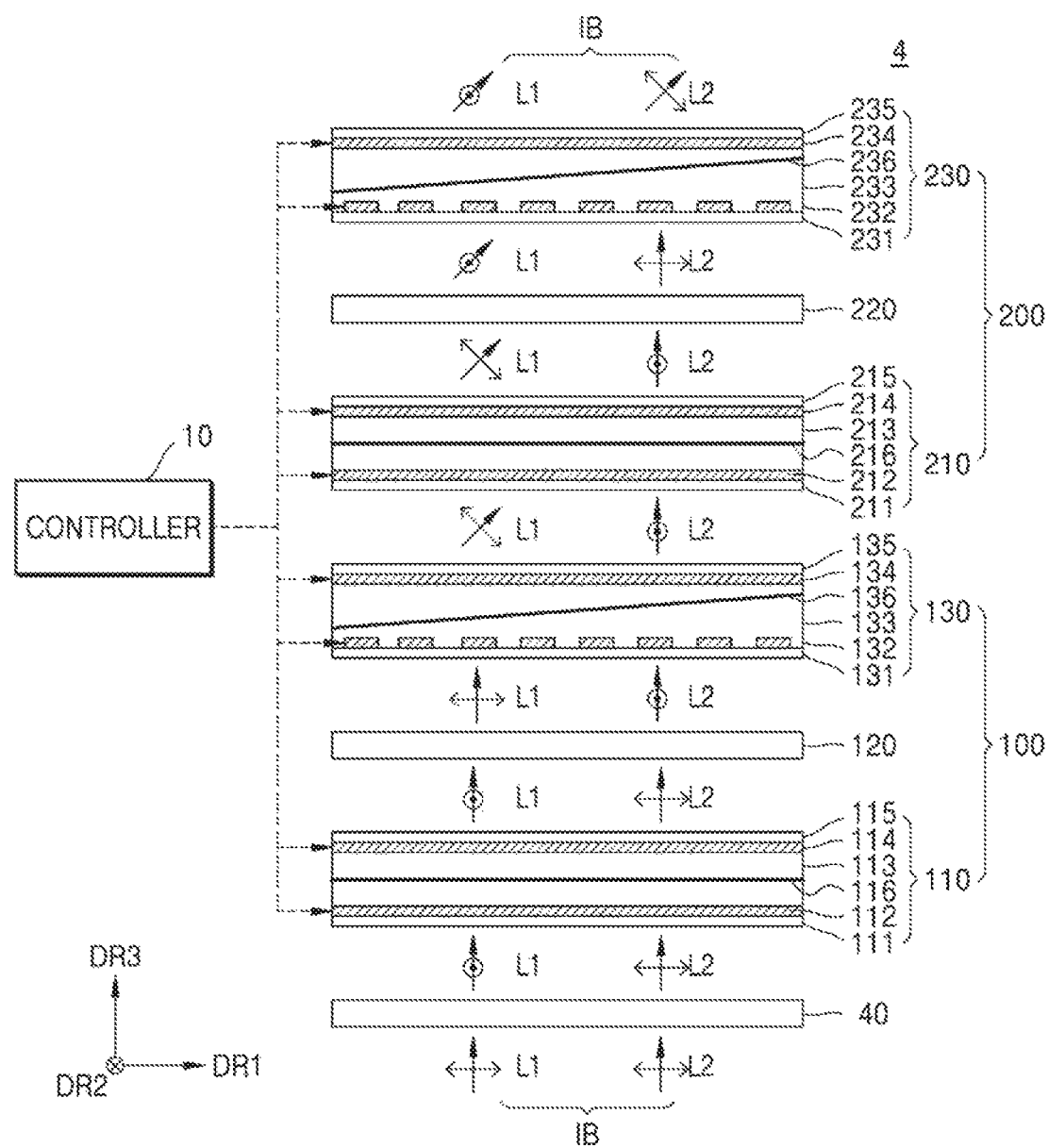
FIG. 12 is a conceptual view of a beam deflector of FIG. 10, viewed in a second direction.

FIG. 10 is a perspective view of a beam deflector 4 according to an example embodiment. FIG. 11 is a conceptual view of the beam defector 4 of FIG. 10, viewed in the first direction. FIG. 12 is a conceptual view of the beam defector 4 of FIG. 10, viewed in the second direction. For brevity of a description, matters that are substantially the same as those described above with reference to FIGS. 1 through 3 will not be described.

Referring to FIGS. 10 through 12, the beam deflector 4 may be provided which includes a first selective polarization conversion element 40, the first sub-deflector 100, the second sub-deflector 200, and the controller 10. The first sub-deflector 100, the second sub-deflector 200, and the controller 10 may be substantially the same as the first sub-deflector 100, the second sub-deflector 200, and the controller 10 described with reference to FIGS. 1 through 3.

The first selective polarization conversion element 40 may be provided on a side opposite to the second sub-deflector 200 with respect to the first sub-deflector 100. The beam IB may sequentially pass through the first selective polarization conversion element 40, the first sub-deflector 100, and the second sub-deflector 200. For example, the first selective polarization conversion element 40, the first sub-deflector 100, and the second sub-deflector 200 may be arranged in the third direction DR3.

The first light L1 and the second light L2 incident to the first selective polarization conversion element 40 may have the same polarization directions. For example, each of the first light L1 and the second light L2 incident to the first selective polarization conversion element 40 may have the second polarization direction (e.g., denoted by ⊙ in FIG. 11 or ↔ in FIG. 12).

The first selective polarization conversion element 40 may selectively convert the polarization direction of the first light L1 having a first wavelength band. For example, the first selective polarization conversion element 40 may include optically anisotropic polymer or an inorganic material having wavelength selectivity with respect to the first wavelength band. The first selective polarization conversion element 40 may convert the polarization direction of the first light L1 into the first polarization direction. The first selective polarization conversion element 40 may maintain the polarization direction of light having a wavelength band other than the first wavelength band. For example, the first selective polarization conversion element 40 may maintain the second polarization direction as the polarization direction of the second light L2 having the second wavelength band that is different from the first wavelength band. The first selective polarization conversion element 40 may convert the polarization direction of the first light L1 into the first polarization direction (e.g., denoted by ↔ in FIG. 11 or ⊙ in FIG. 12).

According to an example embodiment, the beam deflector 4 including the first selective polarization conversion element 40 may selectively convert the polarization direction of the first light L1.

Figure 13:
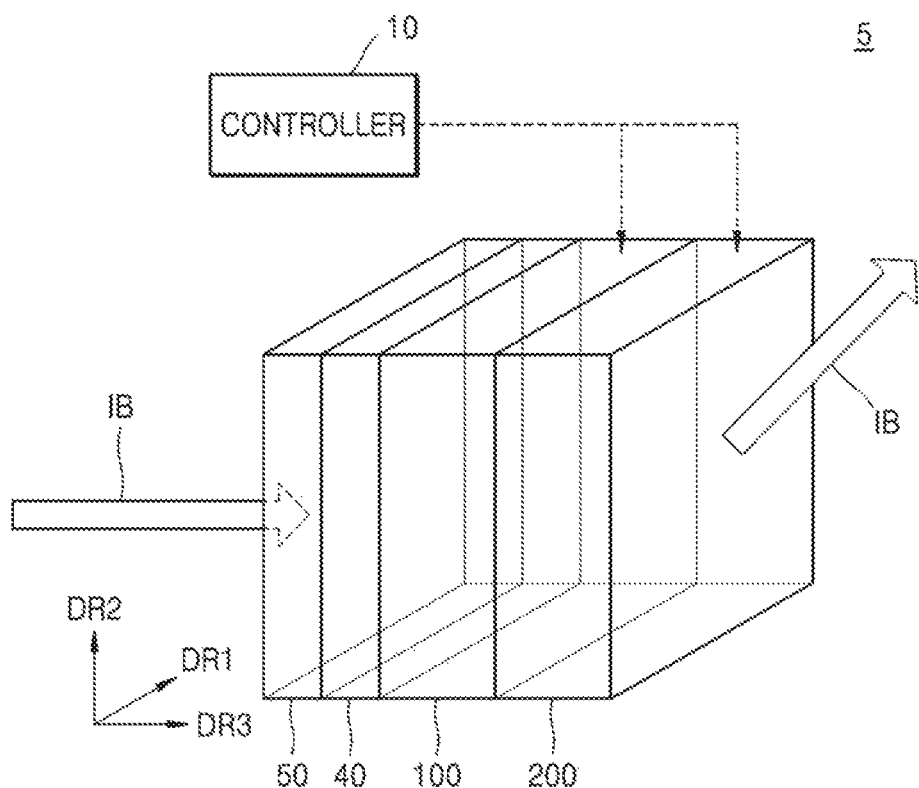
FIG. 13 is a perspective view of a beam deflector according to an example embodiment.
Figure 14:
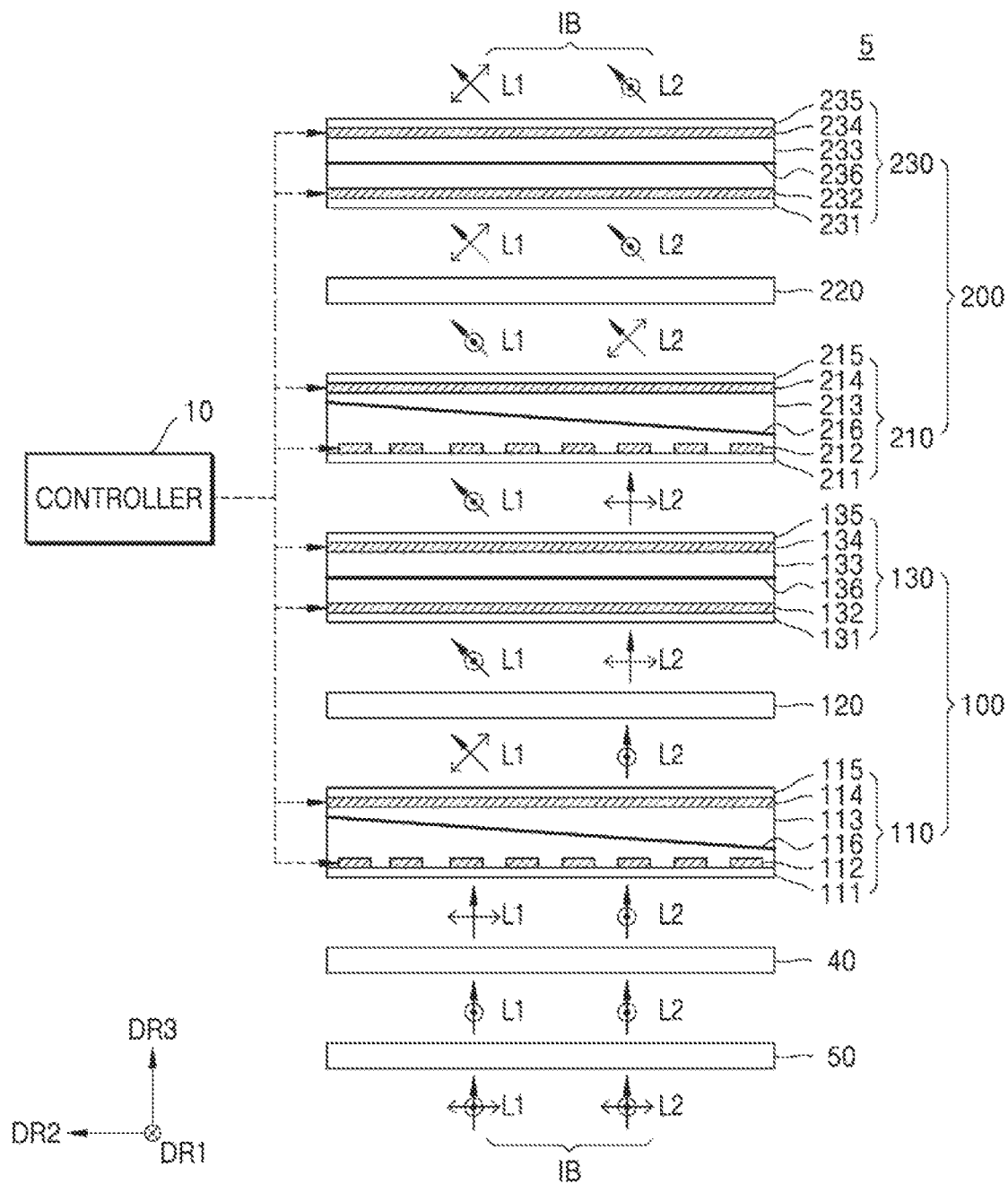
FIG. 14 is a conceptual view of a beam deflector of FIG. 13, viewed in a first direction.
Figure 15:
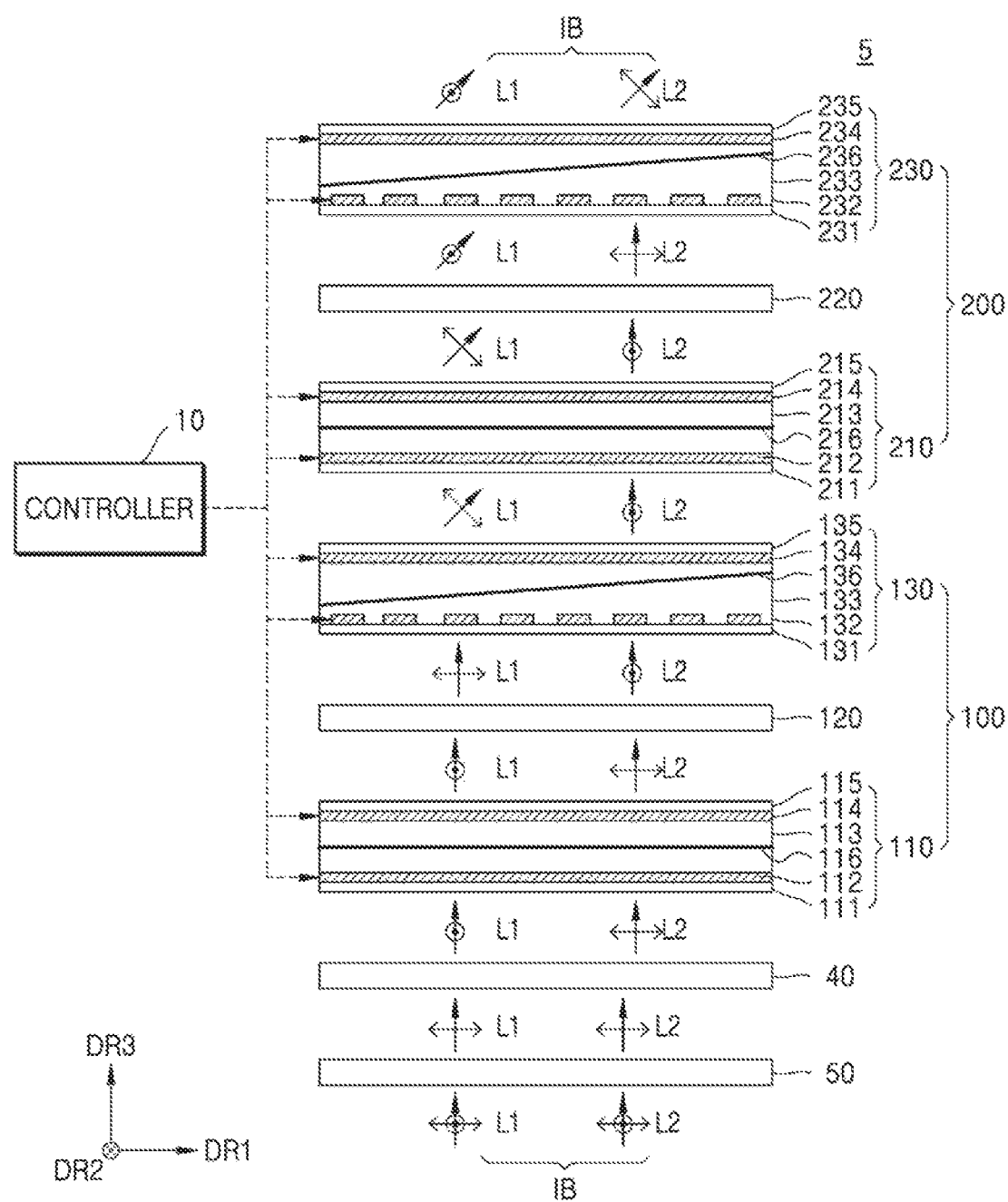
FIG. 15 is a conceptual view of a beam deflector of FIG. 13, viewed in a second direction.

FIG. 13 is a perspective view of a beam deflector 5 according to an example embodiment. FIG. 14 is a conceptual view of the beam defector 5 of FIG. 13, viewed in the first direction. FIG. 15 is a conceptual view of the beam defector 5 of FIG. 13, viewed in the second direction. For brevity of a description, matters that are substantially the same as those described above with reference to FIGS. 1 through 3 and those described above with reference to FIGS. 10 through 12 will not be described.

Referring to FIGS. 13 through 15, the beam deflector 5 may be provided which includes a polarization generation element 50, the first selective polarization conversion element 40, the first sub-deflector 100, the second sub-deflector 200, and the controller 10. The first sub-deflector 100, the second sub-deflector 200, and the controller 10 may be substantially the same as those described with reference to FIGS. 1 through 3. The first selective polarization conversion element 40 may be substantially the same as those described with reference to FIGS. 10 through 12.

The polarization generation element 50 may be provided on a side opposite to the first sub-deflector 100 with respect to the first selective polarization conversion element 40. The beam IB may sequentially pass through the polarization generation element 50, the first selective polarization conversion element 40, the first sub-deflector 100, and the second sub-deflector 200. For example, the polarization generation element 50, the first selective polarization conversion element 40, the first sub-deflector 100, and the second sub-deflector 200 may be arranged in the third direction DR3. The beam IB incident to the polarization generation element 50 may be unpolarized light. The beam IB may include first light L1 having the first wavelength band and the second light L2 having the second wavelength band that is different from the first wavelength band. The first light L1 and the second light L2 incident to the polarization generation element 50 may be unpolarized light.

The polarization generation element 50 may polarize the beam IB. For example, the polarization generation element 50 may polarize each of the first light L1 and the second light L2 to the second polarization direction (e.g., denoted by ⊙ in FIG. 14 or ↔ in FIG. 15), as illustrated in FIGS. 14 and 15. As another example, the polarization generation element 50 may polarize each of the first light L1 and the second light L2 to the first polarization direction. The polarization generation element 50 may provide the polarized beam IB to the first selective polarization conversion element 40.

As described with reference to FIGS. 10 through 12, the polarization direction of the first light L1 may be converted from the second polarization direction to the first polarization direction (e.g., denoted by ↔ in FIG. 14 or ⊙ in FIG. 15) by the first selective polarization conversion element 40. The first selective polarization conversion element 40 may not convert the polarization direction of the second light L2 having a second wavelength band that is different from the first wavelength band. The first selective polarization conversion element 40 may provide the first light L1 having the first polarization direction and the second light L2 having the second polarization direction to the first sub-deflector 100.

According to an example embodiment, the beam deflector 5 including the polarization generation element 50 may deflect the beam IB including unpolarized light.

Figure 16:
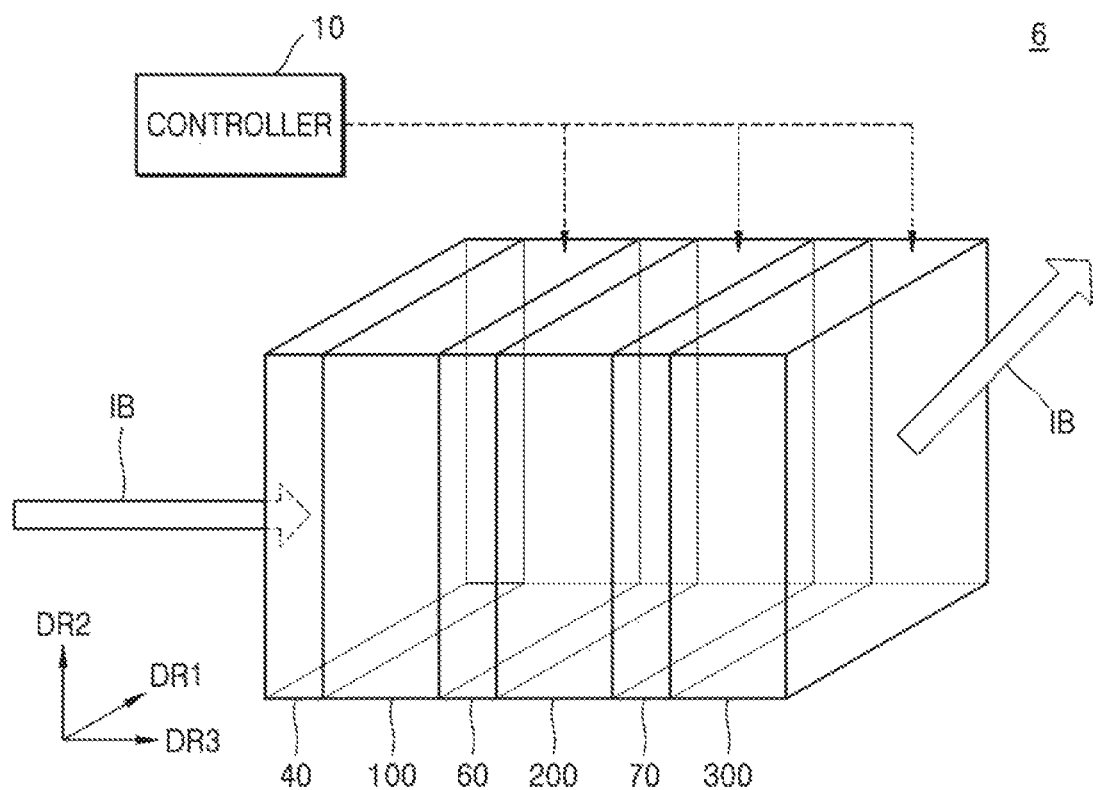
FIG. 16 is a perspective view of a beam deflector according to an example embodiment.
Figure 17:
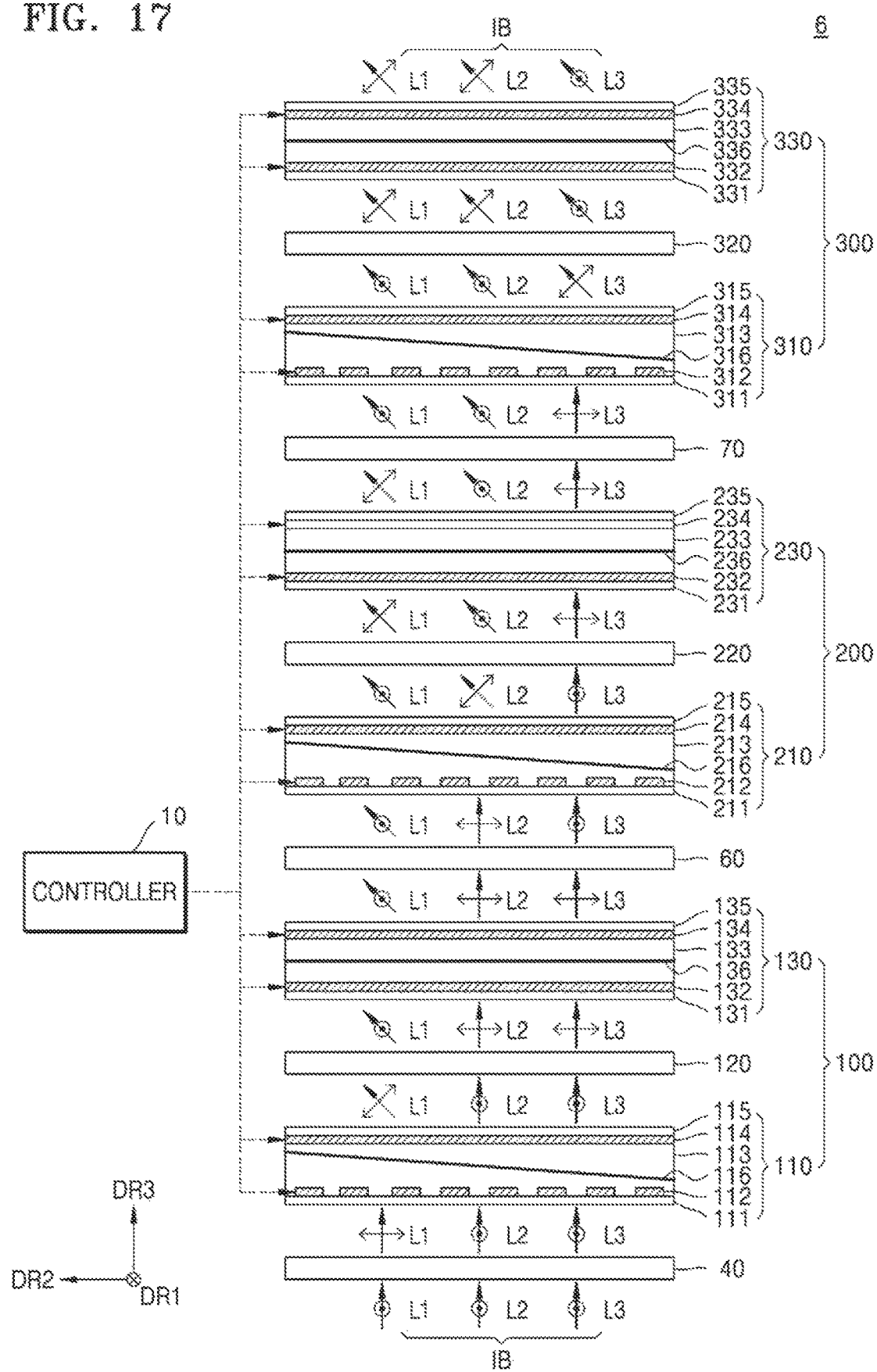
FIG. 17 is a conceptual view of a beam deflector of FIG. 16, viewed in a first direction.
Figure 18:
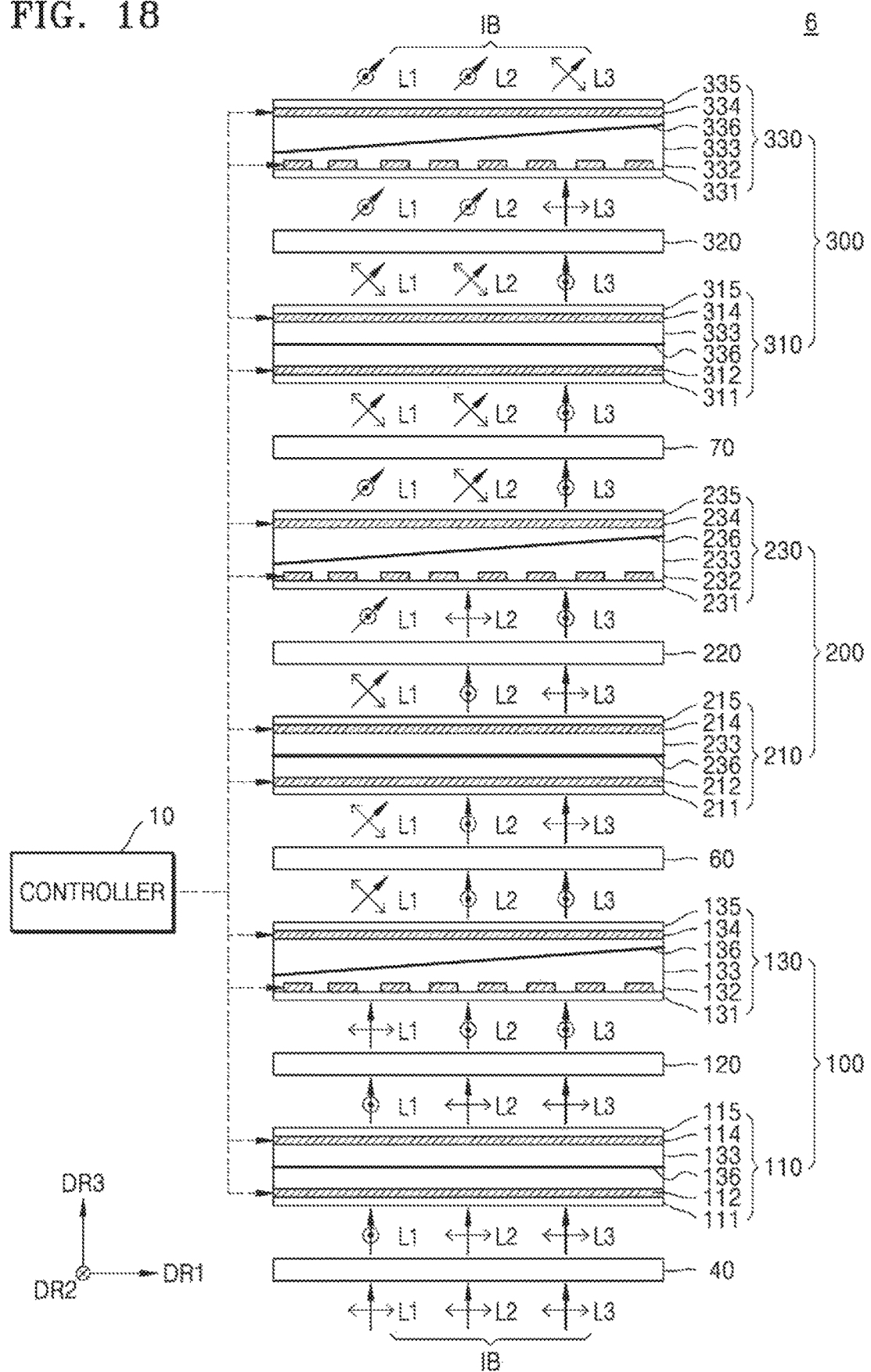
FIG. 18 is a conceptual view of a beam deflector of FIG. 16, viewed in a second direction.

FIG. 16 is a perspective view of a beam deflector 6 according to an example embodiment. FIG. 17 is a conceptual view of the beam defector 6 of FIG. 16, viewed in the first direction. FIG. 18 is a conceptual view of the beam defector 6 of FIG. 16, viewed in a second direction. For brevity of a description, matters that are substantially the same as those described above with reference to FIGS. 1 through 3 and those described above with reference to FIGS. 10 through 12 will not be described.

Referring to FIGS. 16 through 18, the beam deflector 6 may be provided which includes the first selective polarization conversion element 40, the first sub-deflector 100, a second selective polarization conversion element 60, the second sub-deflector 200, a third selective polarization conversion element 70, a third sub-deflector 300, and the controller 10. The first sub-deflector 100 and the second sub-deflector 200 may be substantially the same as those described with reference to FIGS. 1 through 3. The first selective polarization conversion element 40 may be substantially the same as those described with reference to FIGS. 10 through 12.

The beam IB may sequentially pass through the first selective polarization conversion element 40, the first sub-deflector 100, the second selective polarization conversion element 60, the second sub-deflector 200, the third selective polarization conversion element 70, and the third sub-deflector 300. For example, the first selective polarization conversion element 40, the first sub-deflector 100, the second selective polarization conversion element 60, the second sub-deflector 200, the third selective polarization conversion element 70, and the third sub-deflector 300 may be arranged in the third direction DR3.

The beam IB may further include third light L3. The third light L3 may be light of a third wavelength band. The third wavelength band may be different from the first wavelength band and the second wavelength band, respectively. The first selective polarization conversion element 40 may selectively convert the polarization direction of the first light L1 having a first wavelength band. The first selective polarization conversion element 40 may not convert the polarization direction of the second light L2 and the third light L3.

The first light L1, the second light L2, and the third light L3 incident to the first sub-deflector 100 may have the first polarization direction (e.g., denoted by ↔ in FIG. 17 or ⊙ in FIG. 18), the second polarization direction (e.g., denoted by ⊙ in FIG. 17 or ↔ in FIG. 18), and the second polarization direction, respectively. As described with reference to FIGS. 1 through 3, the first sub-deflector 100 may deflect the first light L1. The first sub-deflector 100 may maintain light paths of the second light L2 and the third light L3. For example, the first sub-deflector 100 may not deflect the second light L2 and the third light L3. The first general-purpose polarization conversion element 120 in the first sub-deflector 100 may convert the polarization directions of the first light L1, the second light L2, and the third light L3 to the second polarization direction, the first polarization direction, and the first polarization direction, respectively.

The second selective polarization conversion element 60 may selectively convert the polarization direction of the third light L3 having the third wavelength band. For example, the second selective polarization conversion element 60 may include optically anisotropic polymer or an inorganic material having wavelength selectivity with respect to the third wavelength band. The second selective polarization conversion element 60 may convert the polarization direction of the third light L3 from the first polarization direction into the second polarization direction. The second selective polarization conversion element 60 may maintain the polarization direction of light having a wavelength band other than the third wavelength band. For example, the second selective polarization conversion element 60 may maintain the second polarization direction and the first polarization direction as the polarization direction of the first light L1 and the polarization direction of the second light L2, respectively.

The first light L1, the second light L2, and the third light L3 incident to the second sub-deflector 200 may have the second polarization direction, the first polarization direction, and the second polarization direction, respectively. As described with reference to FIGS. 1 through 3, the second sub-deflector 200 may deflect the second light L2. The second sub-deflector 200 may maintain light paths of the first light L1 and the third light L3. For example, the second sub-deflector 200 may not deflect the first light L1 and the third light L3. The second general-purpose polarization conversion element 220 in the second sub-deflector 200 may convert the polarization directions of the first light L1, the second light L2, and the third light L3 to the first polarization direction, the second polarization direction, and the first polarization direction, respectively.

The third selective polarization conversion element 70 may selectively convert the polarization direction of the first light L1 having the first wavelength band. For example, the third selective polarization conversion element 70 may include optically anisotropic polymer or an inorganic material having wavelength selectivity with respect to the first wavelength band. The third selective polarization conversion element 70 may convert the polarization direction of the first light L1 into the second polarization direction. The third selective polarization conversion element 70 may maintain the polarization direction of light having a wavelength band other than the first wavelength band. The third selective polarization conversion element 70 may maintain the second polarization direction and the first polarization direction as the polarization direction of the second light L2 and the polarization direction of the third light L3, respectively.

The first light L1, the second light L2, and the third light L3 incident to the third sub-deflector 300 may have the second polarization direction, the second polarization direction, and the first polarization direction, respectively. The third sub-deflector 300 may deflect the third light L3. The third sub-deflector 300 may include a fifth deflection element 310, a third general-purpose polarization conversion element 320, and a sixth deflection element 330. The first light L1, the second light L2, and the third light L3 may sequentially pass through the fifth deflection element 310, the third general-purpose polarization conversion element 320, and the sixth deflection element 330. For example, the fifth deflection element 310, the third general-purpose polarization conversion element 320, and the sixth deflection element 330 may be arranged in the third direction DR3.

The fifth deflection element 310 may include a fifth lower substrate 311, fifth lower electrodes 312, a fifth upper electrode layer 314, a fifth liquid crystal layer 313, and a fifth upper substrate 315. The fifth lower substrate 311, the fifth lower electrodes 312, the fifth upper electrode layer 314, the fifth liquid crystal layer 313, and the fifth upper substrate 315 may be substantially the same as the first lower substrate 111, the first lower electrodes 112, the first upper electrode layer 114, the first liquid crystal layer 113, and the first upper substrate 115, respectively. The fifth lower electrodes 312 may be arranged in the second direction DR2 and extend in the first direction DR1.

The fifth liquid crystal layer 313 may include a fifth light path conversion plane 316. The fifth light path conversion plane 316 may deflect light having the first polarization direction in the second direction DR2. For example, the fifth light path conversion plane 316 may deflect the third light L3 in the second direction DR2. The third light L3 passing through the fifth light path conversion plane 316 may travel in a combined direction of the third direction DR3 and the second direction DR2.

The fifth light path conversion plane 316 may maintain a path of light having a polarization direction that is different from the first polarization direction. For example, the fifth light path conversion plane 316 may maintain the path of the first light L1 and the path of the second light L2. For example, the fifth light path conversion plane 316 may not deflect the first light L1 and the second light L2.

The third light L3 may be deflected in the second direction DR2 by the fifth deflection element 310. The third light L3 passing through the fifth deflection element 310 may have the first polarization direction. The first light L1 and the second light L2 may not be deflected by the fifth deflection element 310. Each of the first light L1 and the second light L2 passing through the fifth deflection element 310 may have the second polarization direction.

The third general-purpose polarization conversion element 320 may convert the polarization direction of light passing therethrough. The third general-purpose polarization conversion element 320 may convert the first polarization direction into the second polarization direction. For example, the third general-purpose polarization conversion element 320 may convert the polarization direction of the third light L3 into the second polarization direction. The third general-purpose polarization conversion element 320 may convert the second polarization direction into the first polarization direction. For example, the third general-purpose polarization conversion element 320 may convert the polarization direction of the first light L1 and the polarization direction of the second light L2 into the second polarization direction. For example, the third general-purpose polarization conversion element 320 may include a half-wave plate.

The sixth deflection element 330 may include a sixth lower substrate 331, sixth lower electrodes 332, a sixth upper electrode layer 334, a sixth liquid crystal layer 333, and a sixth upper substrate 335. The sixth lower substrate 331, the sixth lower electrodes 332, the sixth upper electrode layer 334, the sixth liquid crystal layer 333, and the sixth upper substrate 335 may be substantially the same as the second lower substrate 131, the second lower electrodes 132, the second upper electrode layer 134, the second liquid crystal layer 133, and the second upper substrate 135, respectively. The sixth lower electrodes 332 may be arranged in the first direction DR1 and extend in a second direction DR2.

The sixth liquid crystal layer 333 may include a sixth light path conversion plane 336. The sixth light path conversion plane 336 may deflect light having the second polarization direction in the first direction DR1. For example, the sixth light path conversion plane 336 may deflect the third light L3 in the first direction DR1. The third light L3 passing through the sixth light path conversion plane 336 may travel in a combined direction of the third direction DR3, the first direction DR1, and the second direction DR2.

The sixth light path conversion plane 336 may maintain the path of the light having a polarization direction that is different from the second polarization direction. For example, the sixth light path conversion plane 336 may maintain the paths of the first light L1 and the second light L2. For example, the sixth light path conversion plane 336 may not deflect the first light L1 and the second light L2.

The third light L3 may be deflected in the first direction DR1 by the sixth deflection element 330. The first light L1 and the second light L2 may not be deflected by the sixth deflection element 330. The third light L3 passing through the sixth deflection element 330 may have the second polarization direction. The first light L1 and the second light L2 passing through the sixth deflection element 330 may have the first polarization direction.

The controller 10 may independently control the first deflection element 110, the second deflection element 130, the third deflection element 210, the fourth deflection element 230, the fifth deflection element 310, and the sixth deflection element 330. For example, to deflect a beam IB incident to the beam deflector 1 in the third direction DR3 to a combined direction of the second direction DR2 and the third direction DR3, the controller 10 may apply a voltage to the first deflection element 110, the third deflection element 210, and the fifth deflection element 310 and may not apply a voltage to the second deflection element 130, the fourth deflection element 230, and the sixth deflection element 330. For example, to deflect the beam IB incident to the beam deflector 1 in the third direction DR3 to a combined direction of the first direction DR1 and the third direction DR3, the controller 10 may not apply a voltage to the first deflection element 110, the third deflection element 210, and the fifth deflection element 310 and may apply a voltage to the second deflection element 130, the fourth deflection element 230, and the sixth deflection element 330. For example, to deflect the beam IB incident to the beam deflector 1 in the third direction DR3 to combined directions of the first direction DR1, the second direction DR2, and the third direction DR3, the controller 10 may not apply a voltage to the first deflection element 110, the second deflection element 130, the third deflection element 210, the fourth deflection element 230, the fifth deflection element 310, and the sixth deflection element 330.

According to an example embodiment, the beam deflector 6 may control a traveling direction of light having different wavelength bands. The first light L1, the second light L2, and the third light L3 having different wavelength bands may be deflected by the first sub-deflector 100, the second sub-deflector 200, and the third sub-deflector 300, respectively. Each of the first light L1, the second light L2, and the third light L3 may be deflected in the first direction DR1 and/or the second direction DR2. Thus, each of the first light L1, the second light L2, and the third light L3 may travel in the combined direction of the third direction DR3 and the first direction DR1, in the combined direction of the third direction DR3 and the second direction DR2, or in the combined direction of the first direction DR1, the second direction DR2, and the third direction DR3.

Figure 19:
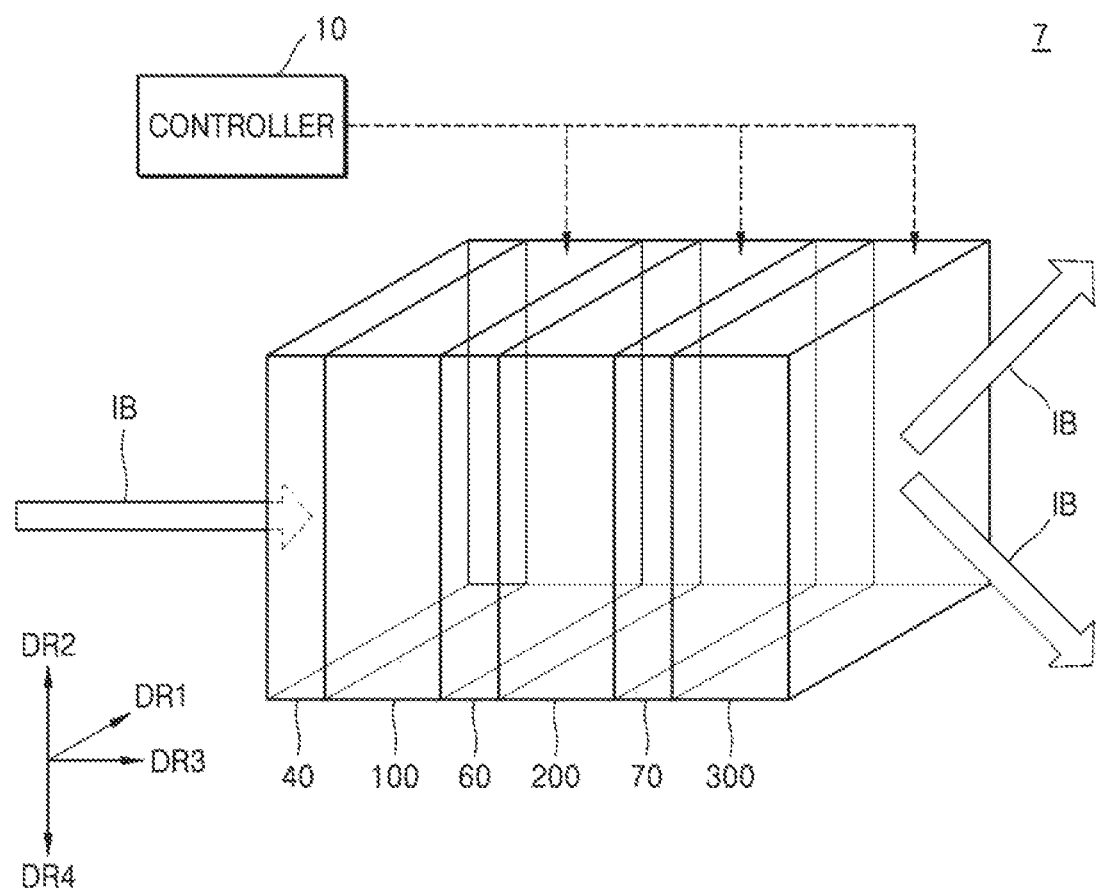
FIG. 19 is a perspective view of a beam deflector according to an example embodiment.
Figure 20:
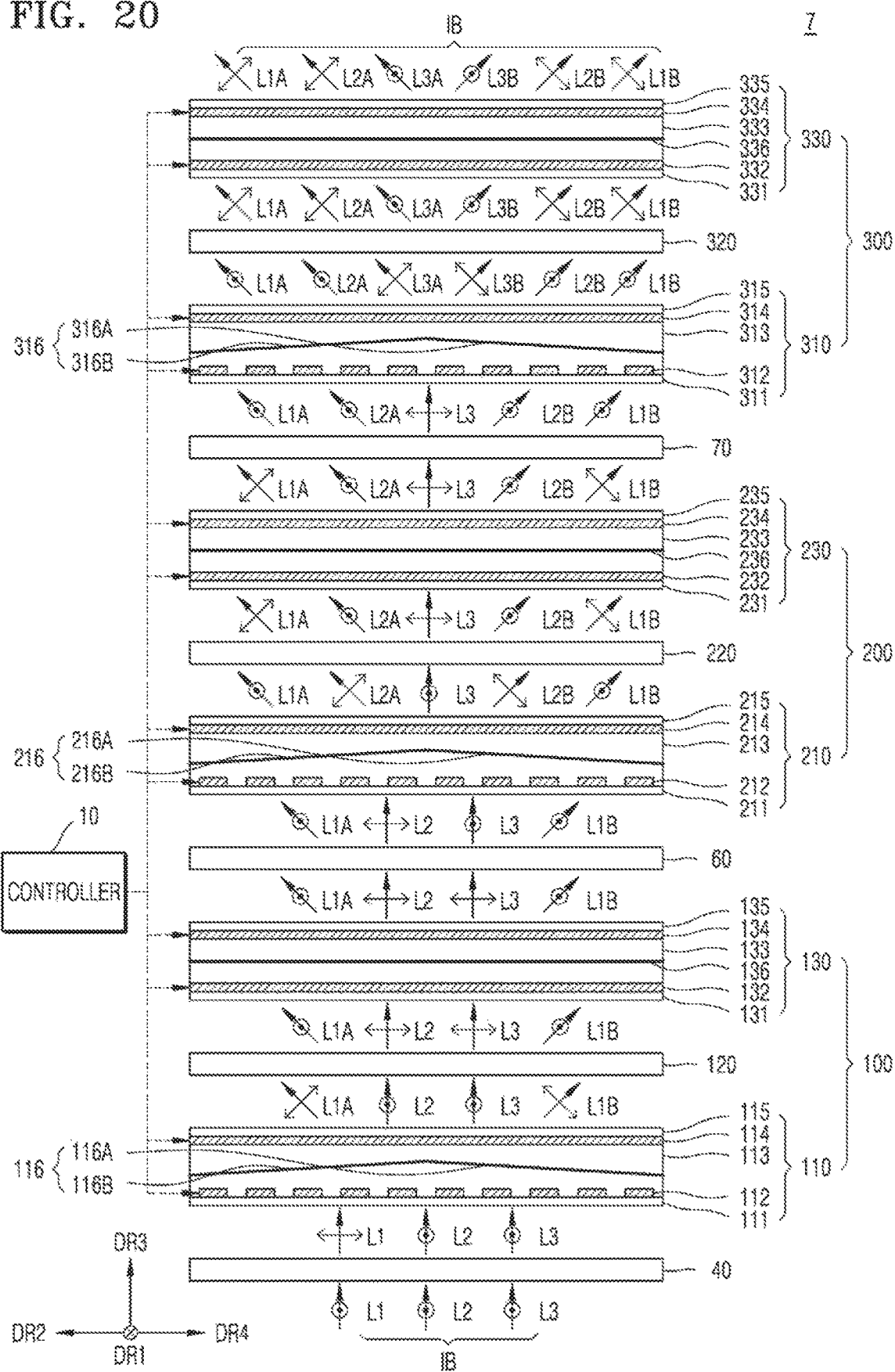
FIG. 20 is a conceptual view of a beam deflector of FIG. 19, viewed in a first direction.
Figure 21:
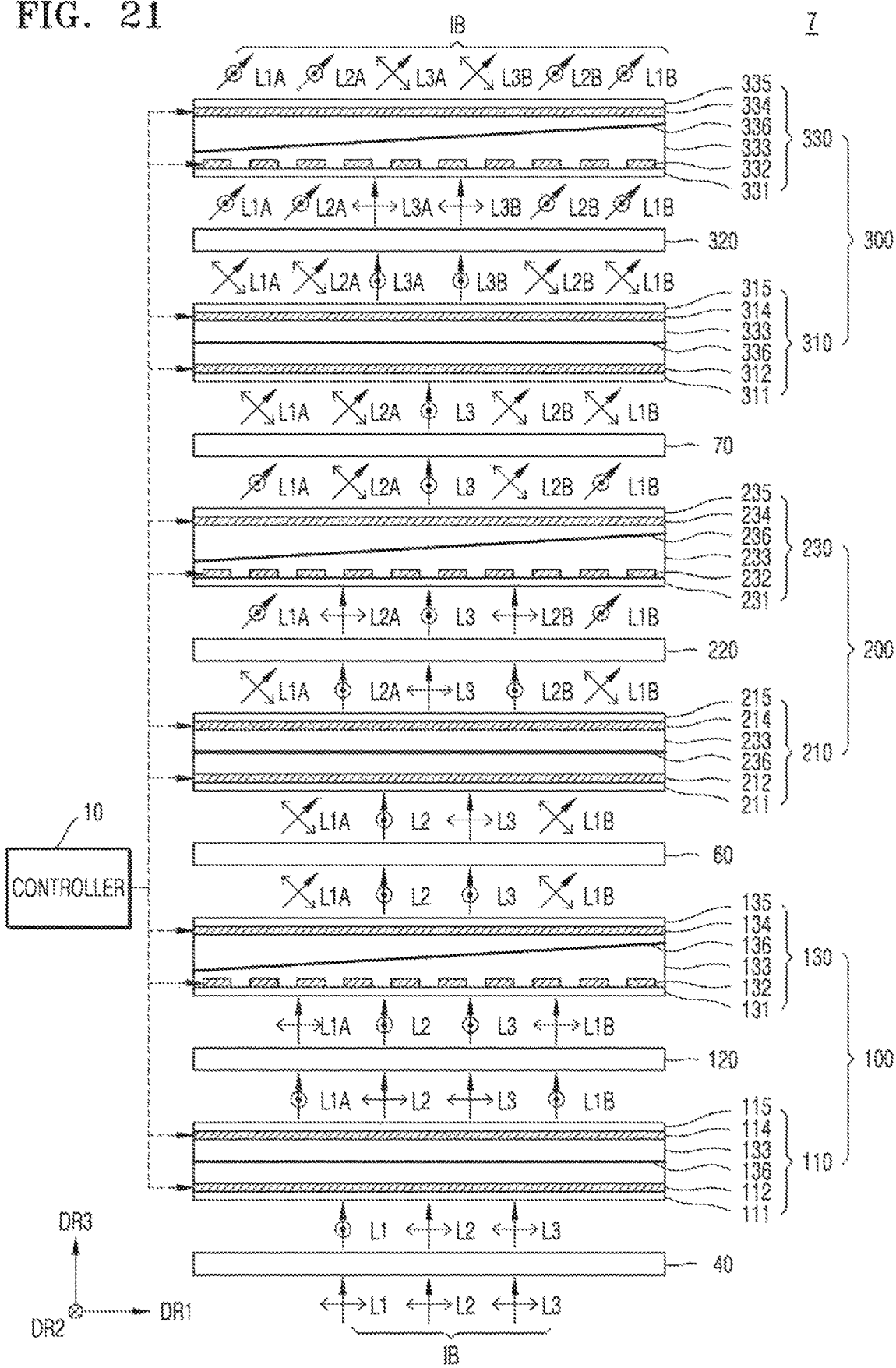
FIG. 21 is a conceptual view of a beam deflector of FIG. 19, viewed in a second direction.

FIG. 19 is a perspective view of a beam deflector 7 according to an example embodiment. FIG. 20 is a conceptual view of the beam defector 7 of FIG. 19, viewed in the first direction. FIG. 21 is a conceptual view of the beam defector 7 of FIG. 19, viewed in a second direction. For brevity of a description, matters that are substantially the same as those described above with reference to FIGS. 16 through 18 will not be described.

Referring to FIGS. 19 through 21, the beam deflector 7 may be provided which includes the first selective polarization conversion element 40, the first sub-deflector 100, a second selective polarization conversion element 60, the second sub-deflector 200, a third selective polarization conversion element 70, a third sub-deflector 300, and the controller 10. Except for matters related to the first light path conversion plane 116, the third light path conversion plane 216, and the fifth light path conversion plane 316, the beam deflector 7 may be substantially the same as the beam deflector 6 described above with reference to FIGS. 16 through 18.

According to an example embodiment as illustrated in FIGS. 19 through 21, the first light path conversion plan 116, the third light path conversion plane 216, and the fifth light path conversion plane 316 may include first sub-conversion planes 116A, 216A, and 316A, and second sub-conversion planes 116B, 216B, and 316B having different slopes.

The first sub-conversion planes 116A, 216A, and 316A of the first light path conversion plane 116, the third light path conversion plane 216, and the fifth light path conversion plane 316 may deflect light having the first polarization direction (e.g., denoted by ↔ in FIG. 20 or ⊙ in FIG. 21) in the second direction DR2. For example, the first sub-conversion planes 116A, 216A, and 316A of the first light path conversion plane 116, the third light path conversion plane 216, and the fifth light path conversion plane 316 may deflect the first light L1, the second light L2, and the third light L3, which have the first polarization direction, in the second direction DR2. In FIGS. 20 and 21, reference numerals indicating the first light L1, the second light L2, and the third light L3 that are deflected in the second direction DR2 are L1A, L2A, and L3A, respectively.

The second sub-conversion planes 1166, 2166, and 3166 of the first light path conversion plane 116, the third light path conversion plane 216, and the fifth light path conversion plane 316 may deflect light having the first polarization direction in a fourth direction DR4 that is opposite to the second direction DR2. For example, the second sub-conversion planes 116β, 2166, and 3166 of the first light path conversion plane 116, the third light path conversion plane 216, and the fifth light path conversion plane 316 may deflect the first light L1, the second light L2, and the third light L3, which have the first polarization direction, in the fourth direction DR4. In FIGS. 20 and 21, reference numerals indicating the first light L1, the second light L2, and the third light L3 that are deflected in the fourth direction DR4 are L1B, L2B, and L3B, respectively.

The controller 10 may adjust a voltage applied to the first lower electrode 112, the third lower electrode 212, and the fifth lower electrode 312 to form the first sub conversion planes 116A, 216A, and 316A and the second sub conversion planes 116B, 216B, and 316B on the first liquid crystal layer 113, the third liquid crystal layer 213, and the fifth liquid crystal layer 313.

According to an example embodiment, the beam deflector 7 may generate a plurality of deflected beams IB at the same time.

Figure 22:
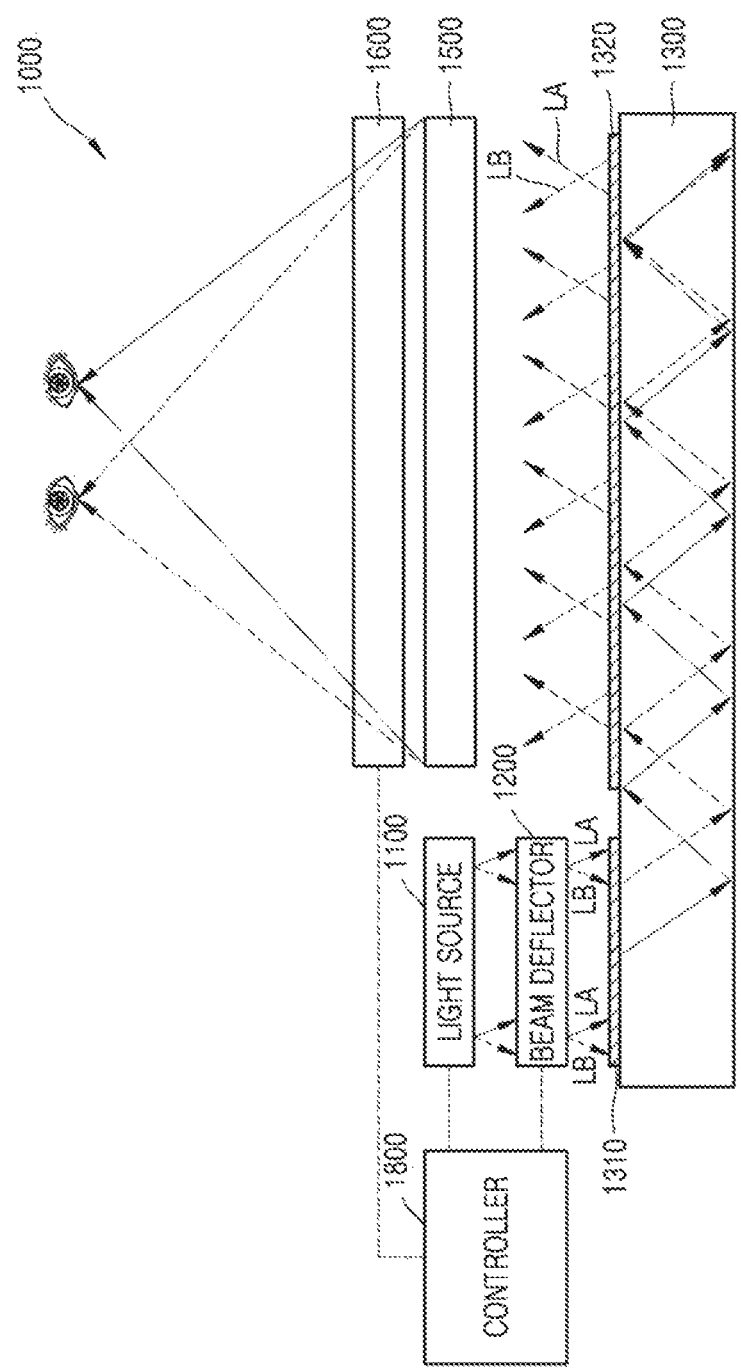
FIG. 22 is a conceptual view of a three-dimensional (3D) display device according to an example embodiment.

FIG. 22 is a conceptual view of a three-dimensional (3D) display device 1000 according to an example embodiment. For brevity of a description, matters that are substantially the same as those described above with reference to FIGS. 1 through 21 will not be described.

The 3D display device 1000 may include a light source 1100 that may emit a coherent light beam including a plurality of wavelength bands, a beam deflector 1200 that may deflect light from the light source 1100, a controller 1800 that may control a direction for deflecting light in the beam deflector 1200, and a spatial light modulator 1600 that may form a holographic image by diffracting incident light.

The 3D display device 1000 may further include a light guide 1300 that may guide the light deflected by the beam deflector 1200 toward the spatial light modulator 1600 and a field lens 1500 that may focus a holographic image on a certain space.

The beam deflector 1200 may include any one of, a modification of, or a combination of the beam deflector 1 shown in FIGS. 1 through 3, the beam deflector 2 shown in FIGS. 4 through 6, the beam deflector 3 of FIGS. 7 through 9, the beam deflector 4 of FIGS. 10 through 12, the beam deflector 5 of FIGS. 13 through 15, the beam deflector 6 of FIGS. 16 through 18, and the beam deflector 7 of FIGS. 19 through 21.

The beam deflector 1200 may deflect light emitted from the light source 1100 to two directions. The lights deflected to two directions may be first deflected light LA and second deflected light LB, respectively. For example, the first deflected light LA and the second deflected light LB may light directed to a left eye and light directed to a right eye, respectively. When the beam deflector 1200 is any one of the beam deflectors 1, 2, 3, 4, 5, and 6 of FIGS. 1 through 18, light incident to the beam deflector 1200 to form the first deflected light LA and the second deflected light LB may be time-serially deflected to two directions, respectively, under control of the controller 400. For example, the first deflected light LA may be first generated, and the second deflected light LB may then be generated. In another example, the second deflected light LB may be first generated, and the first deflected light LA may then be generated. When the beam deflector 1200 is the beam deflector 7 of FIGS. 19 through 21, the light incident to the beam deflector 1200 may be deflected to two directions at the same time.

After the light emitted from the light source 1100 is deflected by the beam deflector 1200, the light may be guided by the light guide 1300, magnified to a size corresponding to the spatial light modulator 1600, and emitted toward the spatial light modulator 1600. The light guide 1300 may further include an input coupler 1310 for causing the light deflected by the beam deflector 1200 to be incident and an output coupler 1320 for emitting the light that travels through the light guide 1300.

Two directional beams emitted through the light guide 1300 may be incident to the spatial light modulator 1600 through the field lens 1500. The spatial light modulator 1600 may form a holographic pattern having an interference pattern for modulating the incident light. The incident light may be diffracted and modulated by the holographic pattern formed by the spatial light modulator 1600, thus reproducing a holographic image in a position on a certain space. A left-eye holographic image may be reproduced in the left-eye position, and a right-eye holographic image may be reproduced in the right-eye position.

According to an example embodiment, the 3D display device 1000 including the beam deflector 1200 may control a traveling direction of light having different wavelength bands.

Figure 23:
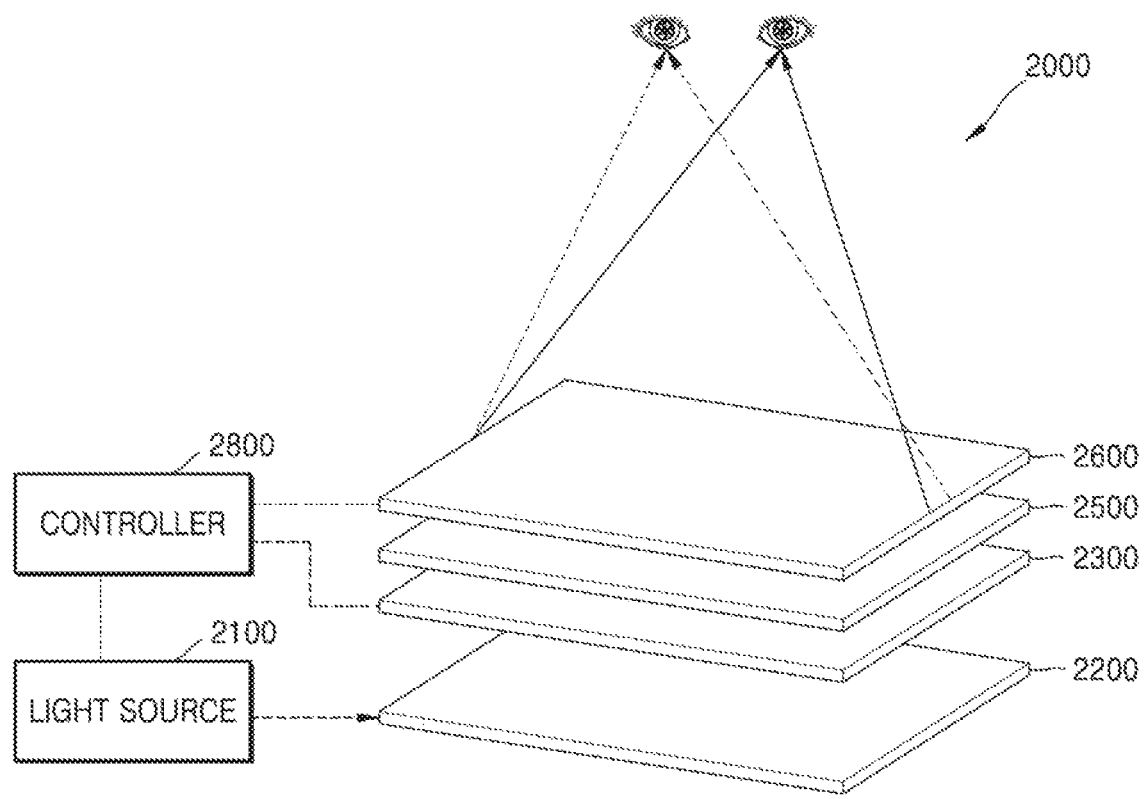
FIG. 23 is a conceptual view of a 3D display device according to an example embodiment.

FIG. 23 is a conceptual view of a 3D display device 2000 according to an example embodiment. For brevity of a description, matters that are substantially the same as those described above with reference to FIGS. 1 through 22 will not be described.

The 3D display device 2000 may include a light source 2100 that may emit a coherent light beam including a plurality of wavelength bands, a beam deflector 2300 that may deflect light from the light source 2100, a controller 2800 that may control a direction for deflecting light in the beam deflector 2300, and a spatial light modulator 2600 that may form a holographic image by diffracting incident light.

The 3D display device 2000 may further include a light guide 2200 that may guide the light coming from the light source 2100 toward the spatial light modulator 2600 and a field lens 2500 that may focus a holographic image on a certain space.

The beam deflector 2300 may include any one of, a modification of, or a combination of the beam deflector 1 shown in FIGS. 1 through 3, the beam deflector 2 shown in FIGS. 4 through 6, the beam deflector 3 of FIGS. 7 through 9, the beam deflector 4 of FIGS. 10 through 12, the beam deflector 5 of FIGS. 13 through 15, the beam deflector 6 of FIGS. 16 through 18, and the beam deflector 7 of FIGS. 19 through 21.

The 3D display device 2000 may be different from the 3D display device 1000 of FIG. 22 in an arranged position of the beam deflector 2300.

The light emitted from the light source 2100 is guided by the light guide 2200, magnified to a size corresponding to the spatial light modulator 2600, and then incident to the beam deflector 2300. The beam deflector 2300 may deflect incident light to a certain desired direction, for example, a direction toward the user's left eye and a direction toward the user's right eye. To form directional light, light incident to the beam deflector 2300 may be time-serially deflected to two directions, respectively, under control of the controller 2800, or the incident light may be deflected to the two directions at the same time by using the beam deflector 7 shown in FIGS. 19 and 20.

Two directional beams emitted through the beam deflector 2300 may be incident to the spatial light modulator 2600 through the field lens 2500. The spatial light modulator 2600 may form a holographic pattern having an interference pattern for modulating the incident light. The incident light may be diffracted and modulated by the holographic pattern formed by the spatial light modulator 2600, thus reproducing a holographic image in a position on a certain space. A left-eye holographic image may be reproduced in the left-eye position, and a right-eye holographic image may be reproduced in the right-eye position.

The 3D display devices 1000 and 2000 of FIGS. 22 and 23 may further include an eye tracking sensor and the left-eye position and the right-eye position of the user may be tracked using the eye tracking sensor to control the deflected beam to be emitted to a corresponding position.

One or more example embodiments may provide a beam deflector that deflects a beam including light having different wavelength bands.

One or more example embodiments may provide a method of deflecting a beam including light having different wavelength bands.

One or more example embodiments may provide a 3D display device including a beam deflector that deflects a beam including light having different wavelength bands.

However, the effects of embodiments may not be limited to the foregoing disclosure.

It should be understood that example embodiments described herein should be considered in a descriptive sense only and not for purposes of limitation. Descriptions of features or aspects within each example embodiment should typically be considered as available for other similar features or aspects in other embodiments.

While example embodiments have been described with reference to the figures, it will be understood by those of ordinary skill in the art that various changes in form and details may be made therein without departing from the spirit and scope as defined by the following claims.

What is claimed is:

1. A beam deflector comprising:
   a first sub deflector configured to deflect light of a first wavelength band in a first direction and a second direction that intersects the first direction, and convert a polarization direction of the light of the first wavelength band;
   a second sub deflector configured to deflect light of a second wavelength band, that is different from the first wavelength band in the first direction and the second direction, and convert a polarization direction of the light of the second wavelength band;

a third sub deflector configured to deflect light of a third wavelength band that is different from the first wavelength band and the second wavelength band, respectively; and a final polarization conversion element configured to change the polarization direction of the light of the first wavelength band, the polarization direction of the light of the second wavelength band, and the polarization direction of the light of the third wavelength band to coincide with one another, wherein the first sub deflector, the second sub deflector, and the third sub deflector are sequentially provided such that the light of the first wavelength band, the light of the second wavelength band, and the light of the third wavelength band sequentially pass through the first sub deflector and the second sub deflector.

2. The beam deflector of claim 1, further comprising a first selective polarization conversion element configured to convert the polarization direction of the light of the first wavelength band, wherein the first selective polarization conversion element is provided opposite to the second sub deflector with respect to the first sub deflector such that the light of the first wavelength band and the light of the second wavelength band pass through the first selective polarization conversion element and are provided to the first sub deflector.

3. The beam deflector of claim 2, further comprising a polarization generation element configured to polarize unpolarized light, wherein the polarization generation element is provided opposite to the first sub deflector with respect to the first selective polarization conversion element such that the light of the first wavelength band and the light of the second wavelength band pass through the polarization generation element and are provided to the first selective polarization conversion element, and wherein each of the light of the first wavelength band and the light of the second wavelength band that are incident to the polarization generation element is unpolarized light.

4. The beam deflector of claim 1, wherein the first sub deflector comprises:

a first deflection element configured to deflect light having a first polarization direction in the second direction;

a first general-purpose polarization conversion element configured to convert the polarization direction of the light of the first wavelength band and the polarization direction of the light of the second wavelength band; and a second deflection element configured to deflect light having a second polarization direction that is different from the first polarization direction in the first direction, and wherein the first deflection element, the first general-purpose polarization conversion element, and the second deflection element are sequentially provided such that the light of the first wavelength band and the light of the second wavelength band sequentially pass through the first deflection element, the first general-purpose polarization conversion element, and the second deflection element.

5. The beam deflector of claim 4, wherein the first general-purpose polarization conversion element comprises a half-wave plate.

6. The beam deflector of claim 4, wherein the first deflection element comprises:

first lower electrodes arranged in the second direction;

a first upper electrode layer facing the first lower electrodes; and a first liquid crystal layer provided between the first lower electrodes and the first upper electrode layer, and wherein the first liquid crystal layer is controlled by the first lower electrodes and the first upper electrode layer and comprises a first light path conversion plane configured to deflect the light having the first polarization direction in the second direction.

7. The beam deflector of claim 6, wherein the second deflection element comprises:

second lower electrodes arranged in the first direction;

a second upper electrode layer facing the second lower electrodes; and a second liquid crystal layer provided between the second lower electrodes and the second upper electrode layer, and wherein the second liquid crystal layer is controlled by the second lower electrodes and the second upper electrode layer and comprises a second light path conversion plane configured to deflect the light having the second polarization direction in the first direction.

8. The beam deflector of claim 7, wherein the second sub deflector comprises:

a third deflection element configured to deflect light having the first polarization direction in the second direction;

a second general-purpose polarization conversion element configured to convert the polarization direction of the light of the first wavelength band and the polarization direction of the light of the second wavelength band; and a fourth deflection element configured to deflect the light having the second polarization direction in the first direction, and wherein the third deflection element, the second general-purpose polarization conversion element, and the fourth deflection element are sequentially provided such that the light of the first wavelength band and the light of the second wavelength band sequentially pass through the third deflection element, the second general-purpose polarization conversion element, and the fourth deflection element.

9. The beam deflector of claim 8, wherein the third deflection element comprises third lower electrodes arranged in the second direction, a third upper electrode layer facing the third lower electrodes, and a third liquid crystal layer provided between the third lower electrodes and the third upper electrode layer, wherein the fourth deflection element comprises fourth lower electrodes arranged in the first direction, a fourth upper electrode layer facing the fourth lower electrodes, and a fourth liquid crystal layer provided between the fourth lower electrodes and the fourth upper electrode layer, wherein the third liquid crystal layer is controlled by the third lower electrodes and the third upper electrode layer and comprises a third light path conversion plane configured to deflect the light having the first polarization direction in the second direction, and wherein the fourth liquid crystal layer is controlled by the fourth lower electrodes and the fourth upper electrode layer and comprises a fourth light path conversion plane configured to deflect the light having the second polarization direction in the first direction.

10. The beam deflector of claim 9, further comprising:
a second selective polarization conversion element configured to convert the polarization direction of the light of the first wavelength band; and
a third selective polarization conversion element configured to convert the polarization direction of the light of the third wavelength band,
wherein the first sub deflector, the second selective polarization conversion element, the second sub deflector, the third selective polarization conversion element, and the third sub deflector are sequentially provided such that the light of the first wavelength band, the light of the second wavelength band, and the light of the third wavelength band sequentially pass through the first sub deflector, the second selective polarization conversion element, the second sub deflector, the third selective polarization conversion element, and the third sub deflector.

11. The beam deflector of claim 10, wherein the third sub deflector comprises:
a fifth deflection element configured to deflect the light having the first polarization direction in the second direction;
a third general-purpose polarization conversion element configured to convert the polarization direction of the light of the first wavelength band, the polarization direction of the light of the second wavelength band, and the polarization direction of the light of the third wavelength band; and
a sixth deflection element configured to deflect the light having the second polarization direction in the first direction, and
wherein the fifth deflection element, the third general-purpose polarization conversion element, and the sixth deflection element are sequentially provided such that the light of the first wavelength band, the light of the second wavelength band, and the light of the third wavelength band sequentially pass through the fifth deflection element, the third general-purpose polarization conversion element, and the sixth deflection element.

12. The beam deflector of claim 11, wherein the fifth deflection element comprises fifth lower electrodes arranged in the second direction, a fifth upper electrode layer facing the fifth lower electrodes, and a fifth liquid crystal layer provided between the fifth lower electrodes and the fifth upper electrode layer,
wherein the sixth deflection element comprises sixth lower electrodes arranged in the first direction, a sixth upper electrode layer facing the sixth lower electrodes, and a sixth liquid crystal layer provided between the sixth lower electrodes and the sixth upper electrode layer,
wherein the fifth liquid crystal layer is controlled by the fifth lower electrodes and the fifth upper electrode layer and comprises a fifth light path conversion plane configured to deflect the light having the first polarization direction in the second direction, and
wherein the sixth liquid crystal layer is controlled by the sixth lower electrodes and the sixth upper electrode layer and comprises a sixth light path conversion plane configured to deflect the light having the second polarization direction in the first direction.

13. The beam deflector of claim 12, wherein each of the first liquid crystal layer, the third liquid crystal layer, and the fifth liquid crystal layer further comprises a first additional light path conversion plane configured to deflect the light having the first polarization direction in a fourth direction that is opposite to the second direction.

14. The beam deflector of claim 13, further comprising an additional deflector configured to convert paths of the light of the first wavelength band, the light of the second wavelength band, and the light of the third wavelength band that are emitted from the third sub deflector.

15. The beam deflector of claim 11, further comprising a first selective polarization conversion element configured to convert the polarization direction of the light of the first wavelength band,
wherein the first selective polarization conversion element is provided opposite to the second sub deflector with respect to the first sub deflector such that the light of the first wavelength band, the light of the second wavelength band, and the light of the third wavelength band pass through the first selective polarization conversion element and are provided to the first sub deflector.

16. The beam deflector of claim 15, further comprising a polarization generation element configured to polarize unpolarized light,
wherein the polarization generation element is provided opposite to the first sub deflector with respect to the first selective polarization conversion element such that the light of the first wavelength band, the light of the second wavelength band, and the light of the third wavelength band pass through the polarization generation element and are provided to the first selective polarization conversion element, and
wherein each of the light of the first wavelength band, the light of the second wavelength band, and the light of the third wavelength band that are incident to the polarization generation element is unpolarized light.

17. The beam deflector of claim 11,
wherein the final polarization conversion element is configured to receive the light of the first wavelength band, the light of the second wavelength band, and the light of the third wavelength band that are emitted from the sixth deflection element, and to convert the polarization direction of the light of the first wavelength band, the polarization direction of the light of the second wavelength band, and the polarization direction of the light of the third wavelength band.

18. The beam deflector of claim 11, further comprising at least one processor configured to control each of the first deflection element, the second deflection element, the third deflection element, the fourth deflection element, the fifth deflection element, and the sixth deflection element to deflect the light of the first wavelength band, the light of the second wavelength band, and the light of the third wavelength band.

19. A method of deflecting a beam, the method comprising:
deflecting, by a first deflection element, light of a first wavelength band having a first polarization direction in a first direction;
changing, by a first general-purpose polarization conversion element, a polarization direction of the light of the first wavelength band from the first polarization direction to a second polarization direction that intersects the first polarization direction, and converting a polarization direction of light of a second wavelength band that is different from the first wavelength band from the second polarization direction to the first polarization direction;

deflecting, by a second deflection element, the light of the first wavelength band having the second polarization direction in a second direction that intersects the first direction;

deflecting, by a third deflection element, the light of the second wavelength band having the first polarization direction in the first direction;

converting, by a second general-purpose polarization conversion element, a polarization direction of the light of the second wavelength band from the first polarization direction to the second polarization direction, and converting the polarization direction of the light of the second wavelength band from the second polarization direction to the first polarization direction;

deflecting, by a fourth deflection element, the light of the second wavelength band having the second polarization direction in the second direction;

deflecting, by a fifth deflection element, the light having the first polarization direction in the second direction;

converting, by a third general-purpose polarization conversion element, the polarization direction of the light of the first wavelength band, the polarization direction of the light of the second wavelength band, and the polarization direction of the light of the third wavelength band;

deflecting, by a sixth deflection element, the light having the second polarization direction in the first direction; and changing, by a final polarization conversion element, the polarization direction of the light of the first wavelength band, the polarization direction of the light of the second wavelength band, and the polarization direction of the light of the third wavelength band to coincide with one another, wherein the light of the first wavelength band and the light of the second wavelength band sequentially pass through the first deflection element, the first general-purpose polarization conversion element, the second deflection element, the third deflection element, the second general-purpose polarization conversion element, and the fourth deflection element.

20. The method of claim 19, further comprising:

providing, by a first selective polarization conversion element, the light of the first wavelength band having the first polarization direction and the light of the second wavelength band having the second polarization direction to the first deflection element, wherein the first selective polarization conversion element converts the polarization direction of the light of the first wavelength band from the second polarization direction to the first polarization direction and maintains the polarization direction of the light of the second wavelength band as the second polarization direction.

21. The method of claim 20, further comprising providing, by using a polarization generation element, the light of the first wavelength band having the second polarization direction and the light of the second wavelength band having the second polarization direction to the first selective polarization conversion element, wherein the polarization generation element polarizes, in the second polarization direction, the light of the first wavelength band which is unpolarized and the light of the second wavelength band which is unpolarized, and provides the light of the first wavelength band having the second polarization direction and the light of the second wavelength band having the second polarization direction to the first selective polarization conversion element.

22. The method of claim 20, further comprising:

converting, by the second general-purpose polarization conversion element, a polarization direction of light of a third wavelength band that is different from the first wavelength band and the second wavelength band from the first polarization direction to the second polarization direction; and converting, by the third general-purpose polarization conversion element, the polarization direction of the light of the first wavelength band from the first polarization direction to the second polarization direction, the polarization direction of the light of the third wavelength band from the first polarization direction to the second polarization direction, and converting the polarization direction of the light of the first wavelength band and the polarization direction of the light of the second wavelength band from the second polarization direction to the first polarization direction, wherein the light of the first wavelength band, the light of the second wavelength band, and the light of the third wavelength band sequentially pass through the first selective polarization conversion element, the first deflection element, the first general-purpose polarization conversion element, the second deflection element, a second selective polarization conversion element, the third deflection element, the second general-purpose polarization conversion element, the fourth deflection element, a third selective polarization conversion element, the fifth deflection element, the third general-purpose deflection conversion element, and the sixth deflection element, wherein the first selective polarization conversion element maintains the polarization direction of the light of the third wavelength band as the second wavelength band, wherein the first general-purpose polarization conversion element converts the polarization direction of the light of the third wavelength band from the second polarization direction to the first polarization direction, and wherein the second general-purpose polarization conversion element converts the polarization direction of the light of the third wavelength band from the second polarization direction to the first polarization direction.

23. The method of claim 22, further comprising converting, by an additional deflection element, paths of the light of the first wavelength band, the light of the second wavelength band, and the light of the third wavelength band that are emitted from the sixth deflection element.

24. The method of claim 22, further comprising controlling, by at least one processor, the first deflection element, the second deflection element, the third deflection element, the fourth deflection element, the fifth deflection element, and the sixth deflection element.

25. A three-dimensional (3D) display device comprising:
a light source configured to emit a light beam comprising a plurality of wavelength bands;
a beam deflector configured to deflect the light beam;
at least one processor configured to control the beam deflector to deflect light in a predetermined direction; and
a spatial light modulator configured to diffract the light beam to form a holographic image,
wherein the beam deflector comprises:

a first sub deflector configured to deflect light of a first wavelength band in a first direction and a second direction that intersects the first direction, and convert a polarization direction of the light of the first wavelength band; and a second sub deflector configured to deflect light of a second wavelength band that is different from the first wavelength band in the first direction and the second direction, and convert a polarization direction of the light of the second wavelength band;

a third sub deflector configured to deflect light of a third wavelength band that is different from the first wavelength band and the second wavelength band, respectively; and a final polarization conversion element configured to change the polarization direction of the light of the first wavelength band, the polarization direction of the light of the second wavelength band, and the polarization direction of the light of the third wavelength band to coincide with one another, and wherein the first sub deflector, the second sub deflector, and the third sub deflector are provided in a path of the light beam emitted from the light source.

26. The 3D display device of claim 25, wherein the first sub deflector comprises:

a first deflection element configured to deflect light having a first polarization direction in the second direction;

a first general-purpose polarization conversion element configured to convert the polarization direction of the light of the first wavelength band and the polarization direction of the light of the second wavelength band; and a second deflection element configured to deflect light having a second polarization direction that is different from the first polarization direction in the first direction, and wherein the second sub deflector comprises:

a third deflection element configured to deflect light having the first polarization direction in the second direction;

a second general-purpose polarization conversion element configured to convert the polarization direction of the light of the first wavelength band and the polarization direction of the light of the second wavelength band; and a fourth deflection element configured to deflect the light having the second polarization direction in the first direction.

27. The 3D display device of claim 26, further comprising:

a first selective polarization conversion element configured to selectively convert the polarization direction of the light of the first wavelength band;

a second selective polarization conversion element configured to selectively convert the polarization direction of the light of the third wavelength band; and a third selective polarization conversion element configured to selectively convert the polarization direction of the light of the first wavelength band, wherein the first selective polarization conversion element, the first sub deflector, the second selective polarization conversion element, the second sub deflector, the third selective polarization conversion element, and the third sub deflector are sequentially provided such that the light beam sequentially passes through the first selective polarization conversion element, the first sub deflector, the second selective polarization conversion element, the second sub deflector, the third selective polarization conversion element, and the third sub deflector.

28. The 3D display device of claim 27, further comprising a final polarization conversion element configured to change the polarization direction of the light of the first wavelength band, the polarization direction of the light of the second wavelength band, and the polarization direction of the light of the third wavelength band to coincide with each other, wherein the final polarization conversion element is configured to receive the light of the first wavelength band, the light of the second wavelength band, and the light of the third wavelength band that are emitted from the third sub deflector, and to convert the polarization direction of the light of the first wavelength band, the polarization direction of the light of the second wavelength band, and the polarization direction of the light of the third wavelength band.

29. The 3D display device of claim 28, wherein the first sub deflector, the second sub deflector, and the third sub deflector are configured to split the light of the first wavelength band, the light of the second wavelength band, and the light of the third wavelength band, respectively, wherein the light of the first wavelength band is split by the first sub deflector into light deflected in the first direction and the second direction and light deflected in the second direction and a direction opposite to the first direction, wherein the light of the second wavelength band is split by the second sub deflector into light deflected in the first direction and the second direction and light deflected in the second direction and the direction opposite to the first direction, and wherein the light of the third wavelength band is split by the third sub deflector into light deflected in the first direction and the second direction and light deflected in the second direction and the direction opposite to the first direction.

30. A beam deflector comprising:

a first sub deflector configured to deflect light of a first wavelength band in a first direction and a second direction that intersects the first direction, and convert a polarization direction of the light of the first wavelength band;

a second sub deflector configured to deflect light of a second wavelength band, that is different from the first wavelength band in the first direction and the second direction, and convert a polarization direction of the light of the second wavelength band;

a third sub deflector configured to deflect light having a third wavelength band that is different from the first wavelength band and the second wavelength band, respectively, and convert the polarization direction of the light of the first wavelength band, the polarization direction of the light of the second wavelength band, and a polarization direction of the light of the third wavelength band; and a final polarization conversion element configured to change the polarization direction of the light of the first wavelength band, the polarization direction of the light of the second wavelength band, and the polarization direction of the light of the third wavelength band to coincide with one another, wherein the first sub deflector, the second sub deflector, and the third sub deflector are sequentially provided such that the light of the first wavelength band, the light of the second wavelength band, and light of the third wavelength band sequentially pass through the first sub deflector, the second sub deflector, and the third sub deflector.

\* \* \* \* \*